US012674686B2

(12) United States Patent
Sadek

(10) Patent No.: US 12,674,686 B2
(45) Date of Patent: Jul. 7, 2026

(54) ADAPTIVE OPERATIONAL DESIGN DOMAIN CALCULATIONS

(71) Applicant: QUALCOMM Incorporated, San Diego, CA (US)

(72) Inventor: Ahmed Kamel Sadek, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 208 days.

(21) Appl. No.: 18/467,571

(22) Filed: Sep. 14, 2023

(65) Prior Publication Data
US 2025/0093179 A1    Mar. 20, 2025

(51) Int. Cl.
*G01C 21/00* (2006.01)
*G01C 21/34* (2006.01)
*G01C 21/36* (2006.01)

(52) U.S. Cl.
CPC ..... *G01C 21/3889* (2020.08); *G01C 21/3492* (2013.01); *G01C 21/3664* (2013.01); *G01C 21/3691* (2013.01)

(58) Field of Classification Search
CPC ............ G01C 21/3889; G01C 21/3492; G01C 21/3664; G01C 21/3691; H04W 4/40; H04W 4/44
See application file for complete search history.

(56) References Cited

U.S. PATENT DOCUMENTS

| | | | | |
|---|---|---|---|---|
| 2017/0315551 A1* | 11/2017 | Mimura | .............. | B60W 30/143 |
| 2018/0319402 A1* | 11/2018 | Mills | .................... | B60W 10/04 |
| 2019/0041850 A1* | 2/2019 | Chase | .............. | B60W 60/0059 |
| 2019/0047581 A1* | 2/2019 | Bai | ........................ | G06F 9/5027 |
| 2022/0063654 A1* | 3/2022 | Beaurepaire | .......... | B60W 50/14 |
| 2023/0065414 A1* | 3/2023 | Ariannezhad | ...... | G01C 21/3461 |
| 2023/0166761 A1* | 6/2023 | Khorsand Vakilzadeh | ................. B60W 60/001 |
| 2024/0157980 A1* | 5/2024 | Honkanen | ......... | B60W 60/0055 |
| 2024/0400111 A1* | 12/2024 | Badouin | ........... | B60W 60/0053 |

FOREIGN PATENT DOCUMENTS

CN    116353610 A    6/2023

OTHER PUBLICATIONS

International Search Report and Written Opinion—PCT/US2024/045037—ISA/EPO—Dec. 12, 2024.

* cited by examiner

*Primary Examiner* — Faris S Almatrahi
*Assistant Examiner* — Dana F Artimez
(74) *Attorney, Agent, or Firm* — Procopio, Cory, Hargreaves & Savitch LLP

(57) ABSTRACT

A user equipment (UE) may be associated with a vehicle, for example the UE may be a vehicle or may be a wireless device connectively coupled (e.g., wired or wireless connection) to the vehicle. The UE may receive a set of attributes associated with a route of the UE. The UE may calculate a predicted number of operational design domain (ODD) switches along the route based on the set of attributes. In one aspect, the UE may notify a driver associated with the UE of an ODD condition based on the calculated predicted number of ODD switches being greater or equal than a threshold value. In another aspect, the UE may deactivate an ODD mode associated with the UE based on the calculated predicted number of ODD switches being greater or equal than a threshold value.

28 Claims, 16 Drawing Sheets

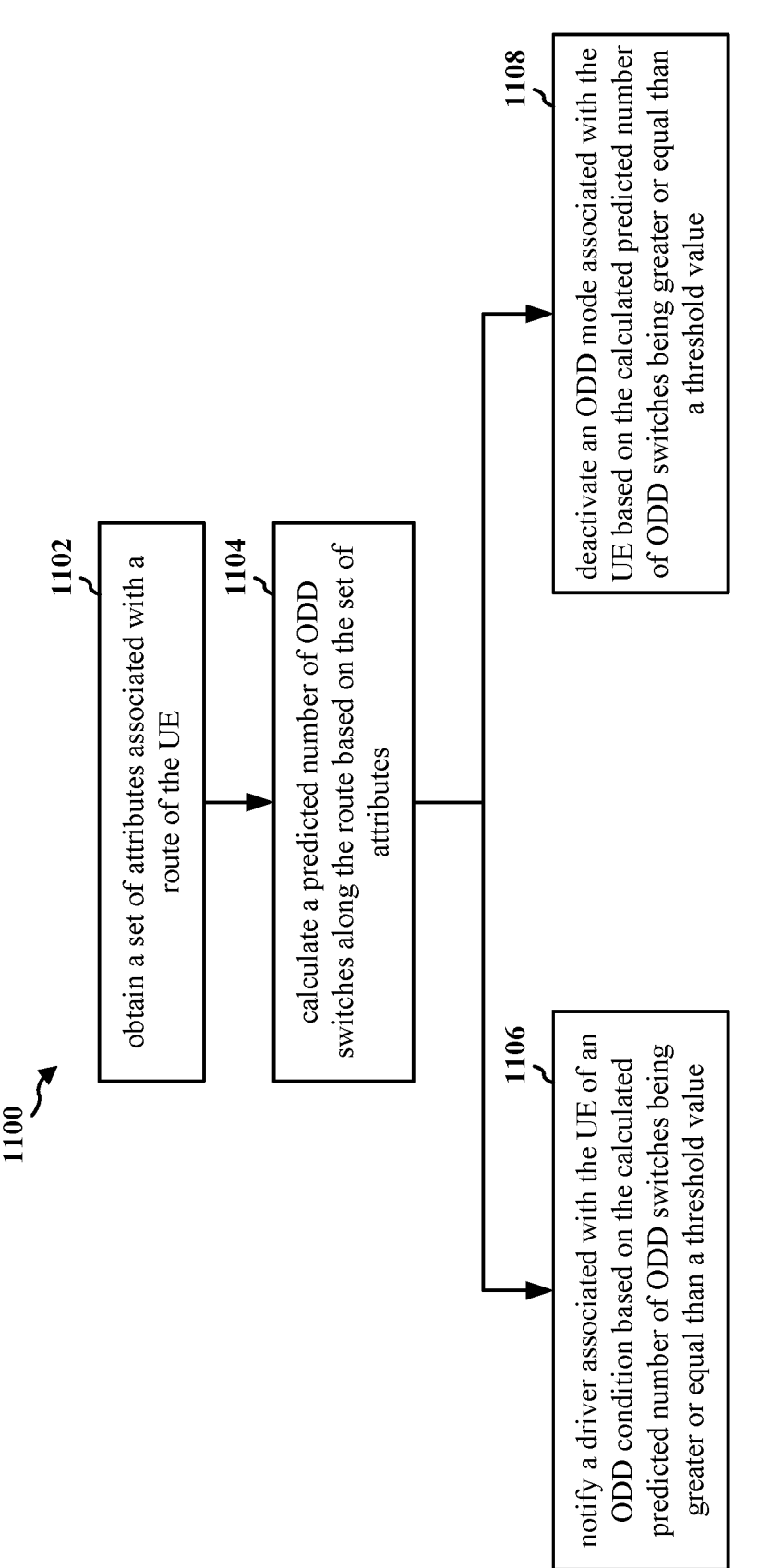

1100

1102
obtain a set of attributes associated with a route of the UE 1104
calculate a predicted number of ODD switches along the route based on the set of attributes 1106
notify a driver associated with the UE of an ODD condition based on the calculated predicted number of ODD switches being greater or equal than a threshold value 1108
deactivate an ODD mode associated with the UE based on the calculated predicted number of ODD switches being greater or equal than a threshold value

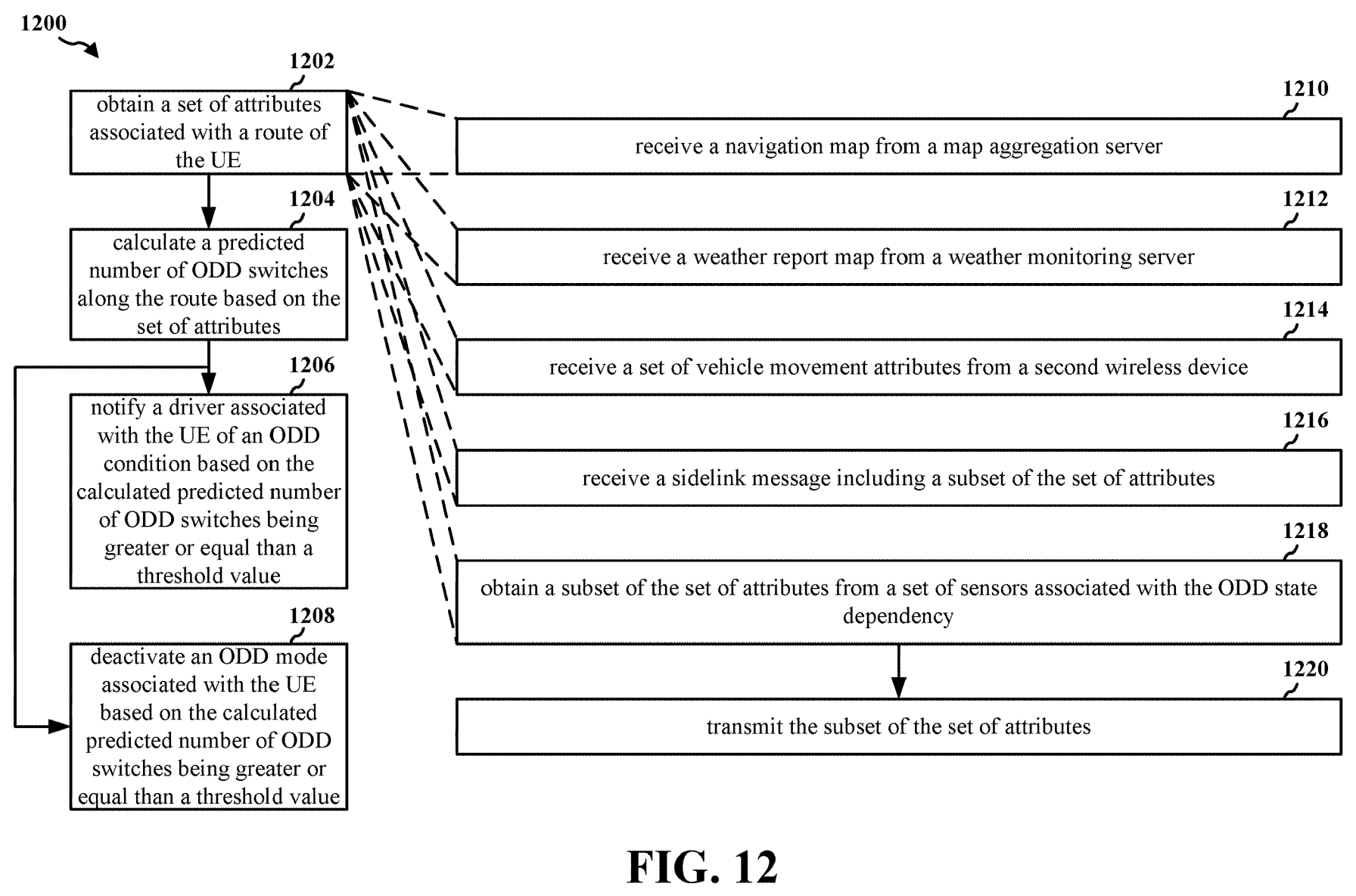

1202 — obtain a set of attributes associated with a route of the UE

1204 — calculate a predicted number of ODD switches along the route based on the set of attributes 1206 — notify a driver associated with the UE of an ODD condition based on the calculated predicted number of ODD switches being greater or equal than a threshold value 1208 — deactivate an ODD mode associated with the UE based on the calculated predicted number of ODD switches being greater or equal than a threshold value 1210 — receive a navigation map from a map aggregation server 1212 — receive a weather report map from a weather monitoring server 1214 — receive a set of vehicle movement attributes from a second wireless device 1216 — receive a sidelink message including a subset of the set of attributes 1218 — obtain a subset of the set of attributes from a set of sensors associated with the ODD state dependency 1220 — transmit the subset of the set of attributes

FIG. 12

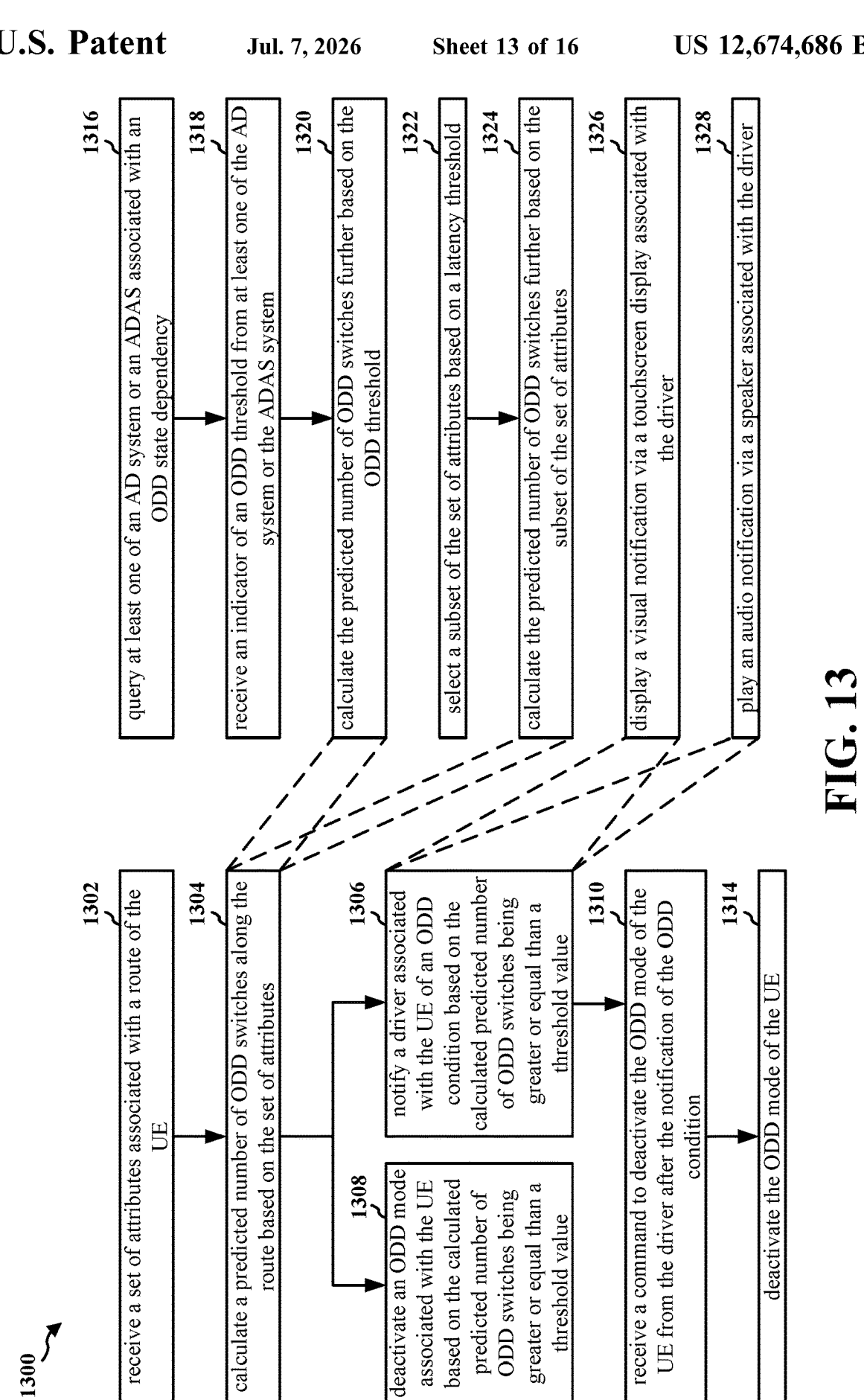

1300

1302 receive a set of attributes associated with a route of the UE 1304 calculate a predicted number of ODD switches along the route based on the set of attributes 1306 notify a driver associated with the UE of an ODD condition based on the calculated predicted number of ODD switches being greater or equal than a threshold value 1308 deactivate an ODD mode associated with the UE based on the calculated predicted number of ODD switches being greater or equal than a threshold value 1310 receive a command to deactivate the ODD mode of the UE from the driver after the notification of the ODD condition 1314 deactivate the ODD mode of the UE 1316 query at least one of an AD system or an ADAS associated with an ODD state dependency 1318 receive an indicator of an ODD threshold from at least one of the AD system or the ADAS system 1320 calculate the predicted number of ODD switches further based on the ODD threshold 1322 select a subset of the set of attributes based on a latency threshold 1324 calculate the predicted number of ODD switches further based on the subset of the set of attributes 1326 display a visual notification via a touchscreen display associated with the driver 1328 play an audio notification via a speaker associated with the driver

FIG. 13

ADAPTIVE OPERATIONAL DESIGN DOMAIN CALCULATIONS

TECHNICAL FIELD

The present disclosure relates generally to communication systems, and more particularly, to a driver assistance system.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a user equipment (UE). The apparatus may be associated with a vehicle, for example the apparatus may be a vehicle or may be a wireless device connectively coupled (e.g., wired or wireless connection) to the vehicle. The apparatus may receive a set of attributes associated with a route of the vehicle. The apparatus may calculate a predicted number of operational design domain (ODD) switches along the route based on the set of attributes. In one aspect, the apparatus may notify a driver associated with the apparatus of an ODD condition based on the calculated predicted number of ODD switches being greater or equal than a threshold value. In another aspect, the apparatus may deactivate an ODD mode associated with the apparatus based on the calculated predicted number of ODD switches being greater or equal than a threshold value.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

BRIEF DESCRIPTION OF THE DRAWINGS

FIG. 11 is a flowchart of a method of wireless communication.

FIG. 12 is a flowchart of a method of wireless communication.

FIG. 13 is a flowchart of a method of wireless communication.

DETAILED DESCRIPTION

Figure 1:
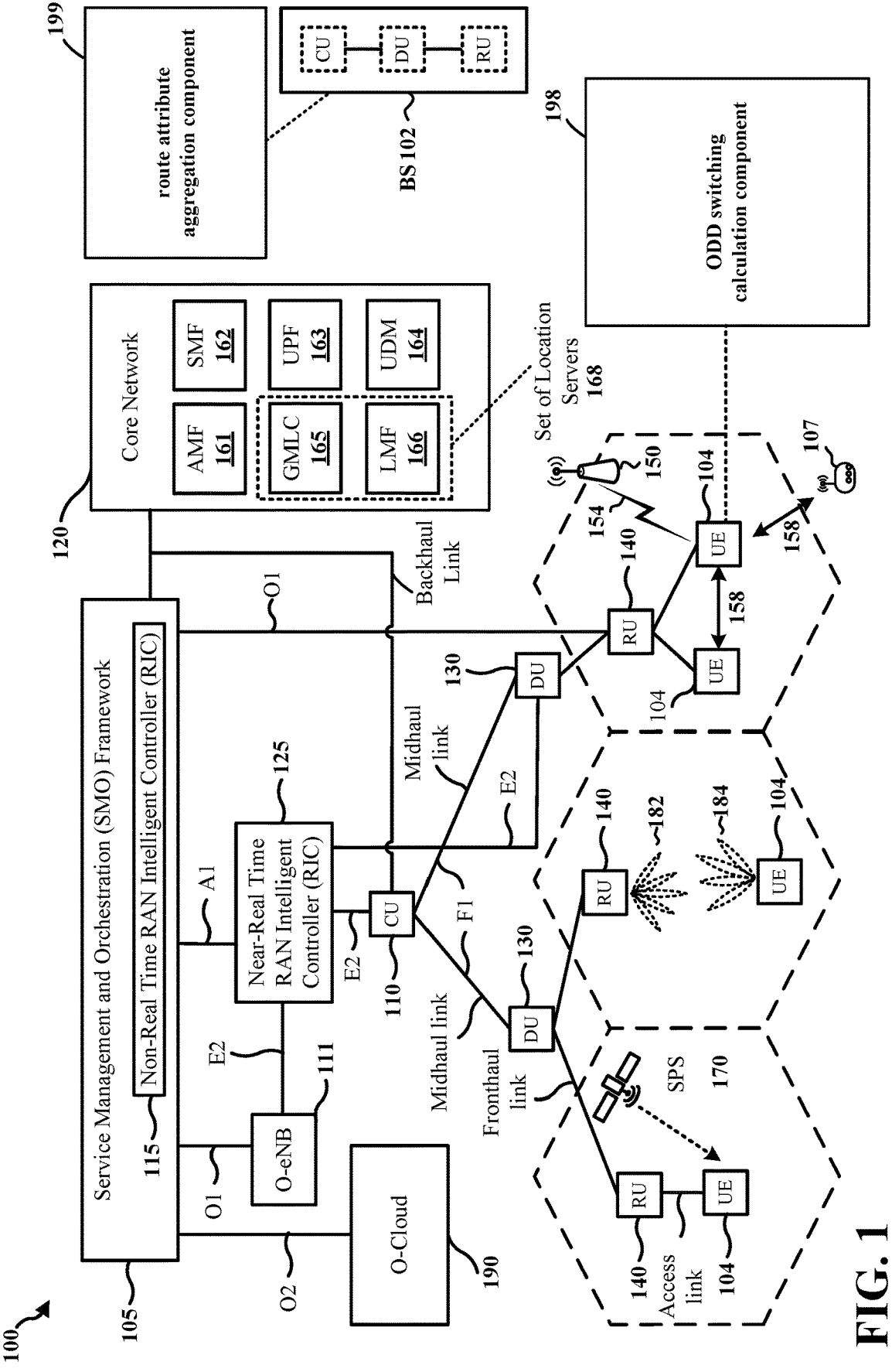
FIG. 1 is a diagram illustrating an example of a wireless communications system and an access network.

The following description is directed to examples for the purposes of describing innovative aspects of this disclosure.

However, a person having ordinary skill in the art may recognize that the teachings herein may be applied in a multitude of ways. Some or all of the described examples may be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described examples may be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), spatial division multiple access (SDMA), rate-splitting multiple access (RSMA), multi-user shared access (MUSA), single-user (SU) multiple-input multiple-output (MIMO) and multi-user (MU)-MIMO. The described examples also may be implemented using other wireless communication protocols or RF signals suitable for use in one or more of a wireless personal area network (WPAN), a wireless local area network (WLAN), a wireless wide area network (WWAN), a wireless metropolitan area network (WMAN), or an internet of things (IoT) network.

Various aspects relate generally to a driver assistance system. Some aspects more specifically relate to vehicles having an autonomous driving (AD) or advanced driver assistance systems (ADAS). In some examples, a user equipment (UE) may receive a set of attributes associated with a route of the UE. The UE may calculate a predicted number of operational design domain (ODD) switches along the route based on the set of attributes. In one aspect, the UE may notify a driver associated with the UE of an ODD condition based on the calculated predicted number of ODD switches being greater or equal than a threshold value. In another aspect, the UE may deactivate an ODD mode associated with the UE based on the calculated predicted number of ODD switches being greater or equal than a threshold value. The UE may be associated with a vehicle, for example the UE may be a vehicle or may be a wireless device connectively coupled (e.g., wired or wireless connection) to the vehicle.

In some aspects, an automated driving system may be configured to operate within a specific ODD (e.g., within a speed range, within a lane of a road). Such systems may be configured to switch on when a vehicle enters an ODD, and may be configured to switch off when the vehicle exits an ODD. A vehicle with an automated driving system may be inefficient if the vehicle switches its automated driving features on and off many times while traveling on a route that has many borders between ODDs and non-ODDs. In some aspects, a UE may calculate a prediction of heightened ODD variability for an ego vehicle based on a dynamic detection of ODD impacting variables on a route based on a set of attributes received by the UE, for example from navigation maps, traffic data, and/or weather data. In some aspects, the UE may notify a driver of a recommendation based on the calculation, for example by making a recommendation to switch off or not switch off an automated driving system. Such a recommendation may be made to a driver of a vehicle, a system controlling the vehicle, and/or to other vehicles sharing the same route as the vehicle. In some aspects, such recommendations may be transmitted to other devices via a cloud or via a vehicle-to-anything (V2X) message. In some aspects, a cloud entity may collect a set of attributes from a set of devices (e.g., vehicles, road-side/roadside units (RSUs), informational databases) associated with a route that may impact the performance of an automated driving system that activates within an ODD. Such cloud entities may transmit the set of attributes to a UE associated with a vehicle via a V2X message.

Particular aspects of the subject matter described in this disclosure can be implemented to realize one or more of the following potential advantages. In some examples, by configuring a UE to calculate a predicted number of ODD switches along a route, the described techniques may be used to optimize use of an automated driving system by reducing the number of ODD switches on a route. Such a UE may improve comfort on a drive within the vehicle, and may minimize switching during a time period. The UE may notify a driver of the vehicle that a high number of ODD switches will be on a portion of a route, in effect recommending to the driver to switch an autonomous driving system off to minimize ODD switches. In some aspects, frequent switching of an autonomous driving system on and off may be communicated to other devices (e.g., via a cloud network), which may be used by the devices to recommend activation/deactivation of an autonomous driving system for other drivers traveling along the same route.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, may be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer. While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage conditions that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface).

Such virtualized network elements can include, but are not limited to, CUs 110, DUs 130, RUs 140 and Near-RT RICs 125. In some implementations, the SMO Framework

105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

A link between a UE 104 and a base station 102 may be established as an access link, e.g., using a UE universal terrestrial radio access network (UTRAN) (Uu) interface. Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

Some examples of sidelink communication may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as vehicle-to-anything (V2X) communications. Sidelink communication may be based on V2X or other D2D communication, such as Proximity Services (ProSe), etc. In addition to UEs, sidelink communication via a D2D communication link 158 may also be transmitted and received by other transmitting and receiving devices, such as Road Side Unit (RSU) 107, etc. Sidelink communication may be exchanged using a PC5 interface, such as described in connection with the example in FIG. 4. Although the following description, including the example slot structure of FIG. 4, may provide examples for sidelink communication in connection with 5G NR, the concepts described herein may be applicable to other similar areas, such as LTE, LTE-A, CDMA, GSM, and other wireless technologies.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHZ-71 GHZ), FR4 (71 GHz-114.25 GHz), and FR5 (114.25 GHZ-300 GHz). Each of these higher frequency bands falls within the EHF band.

With the above aspects in mind, unless specifically stated otherwise, the term "sub-6 GHz" or the like if used herein may broadly represent frequencies that may be less than 6 GHZ, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/ actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may have an ODD switching calculation component 198 that may be configured to receive a set of attributes associated with a route of the UE 104. The ODD switching calculation component 198 may be configured to calculate a predicted number of operational design domain (ODD) switches along the route based on the set of attributes. The ODD switching calculation component 198 may be configured to notify a driver associated with the UE 104 of an ODD condition based on the calculated predicted number of ODD switches being greater or equal than a threshold value. The ODD switching calculation component 198 may be configured to deactivate an ODD mode associated with the UE 104 based on the calculated predicted number of ODD switches being greater or equal than a threshold value. In certain aspects, the base station 102 may have a route attribute aggregation component 199 that may be configured to receive a set of attributes from each of a set of UEs, for example UEs similar to UE 104 with an ODD switching calculation component 198. Each of the set of attributes may be associated with a route. The route attribute aggregation component 199 may aggregate the set of attributes to generate a plurality of attributes associated with a route. The route attribute aggregation component 199 may transmit the plurality of attributes to a UE, such as the UE 104. The route attribute aggregation component 199 may transmit a plurality of sets of attributes to each of a plurality of UEs, where each set of attributes are associated with a route. The ODD switching calculation component 198 may use the plurality of attributes to calculate the predicted number of ODD switches associated with a route of the UE 104.

Figures 2A, 2B, 2C, 2D:
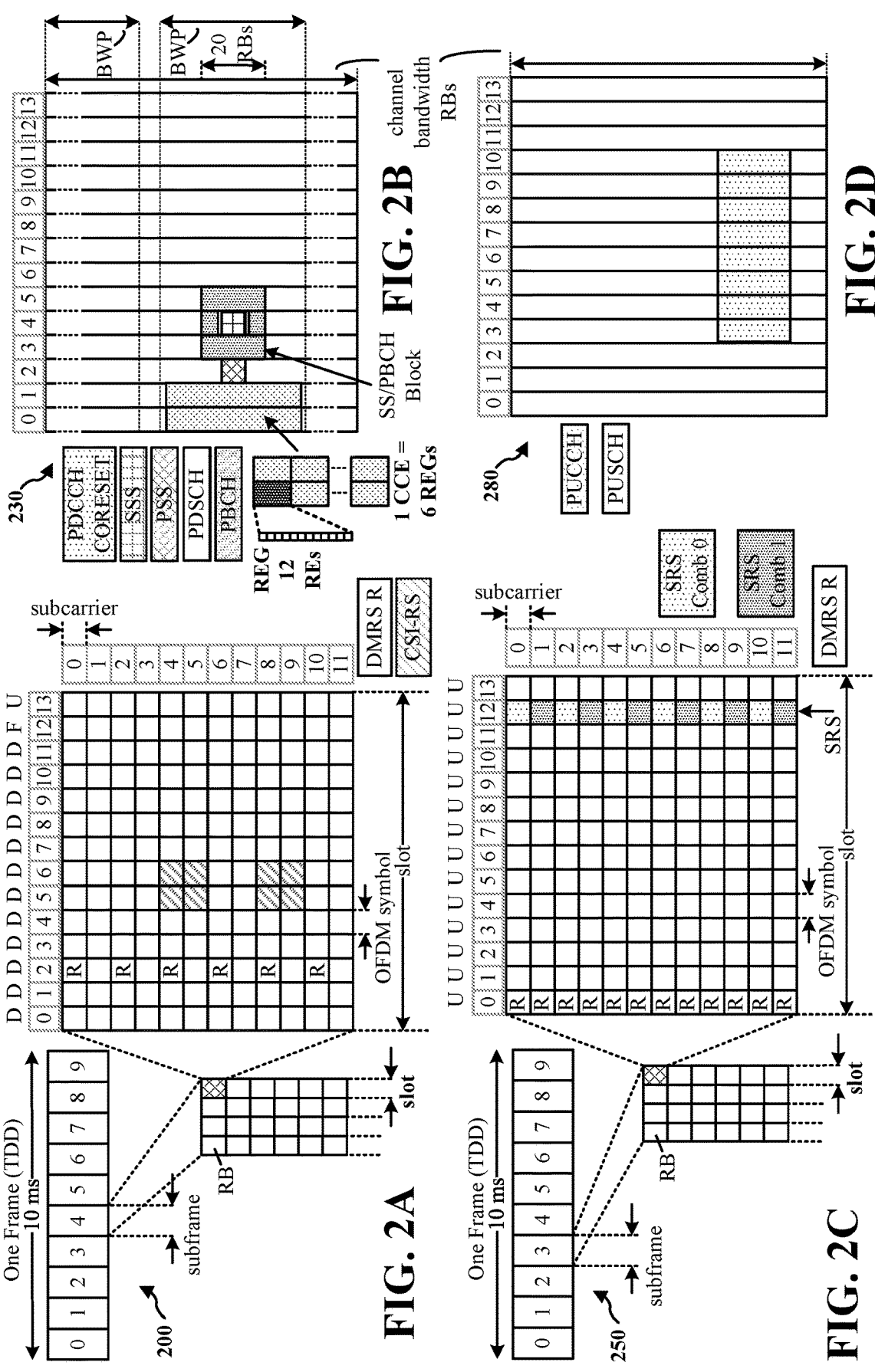
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

| Numerology, SCS, and CP | | |
|---|---|---|
| μ | SCS Δf = $2^\mu \cdot 15$[kHz] | Cyclic prefix |
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies u 0 to 4 allow for 1, 2, 4, 8, and 16 slots, respectively, per subframe. For extended CP, the numerology 2 allows for 4 slots per subframe. Accordingly, for normal CP and numerology u, there are 14 symbols/slot and $2^\mu$ slots/subframe. The subcarrier spacing may be equal to $2^\mu*15$ kHz, where u is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
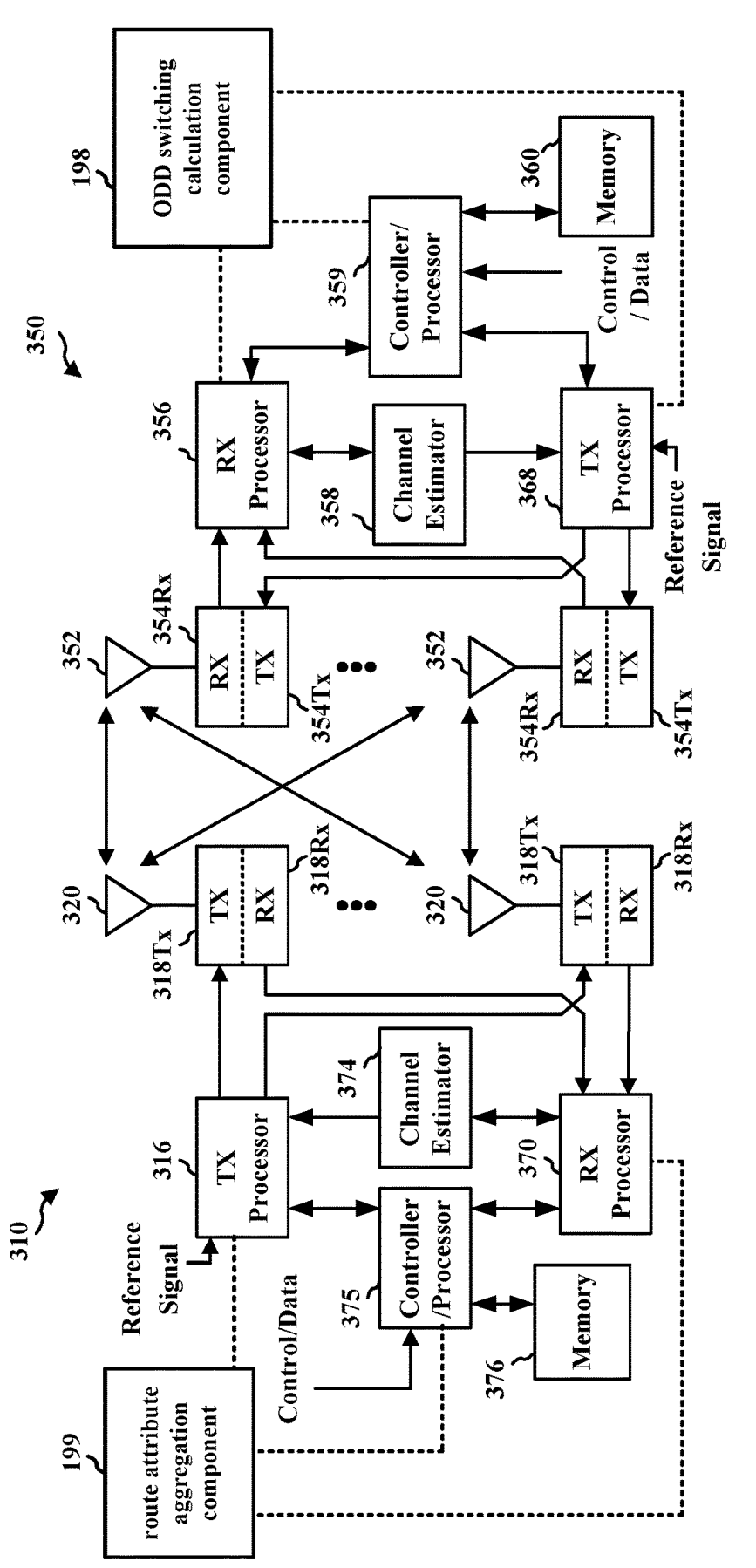
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 376 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the ODD switching calculation component 198 of FIG. 1.

At least one of the TX processor 316, the RX processor 370, and the controller/processor 375 may be configured to perform aspects in connection with the route attribute aggregation component 199 of FIG. 1.

Figure 4:
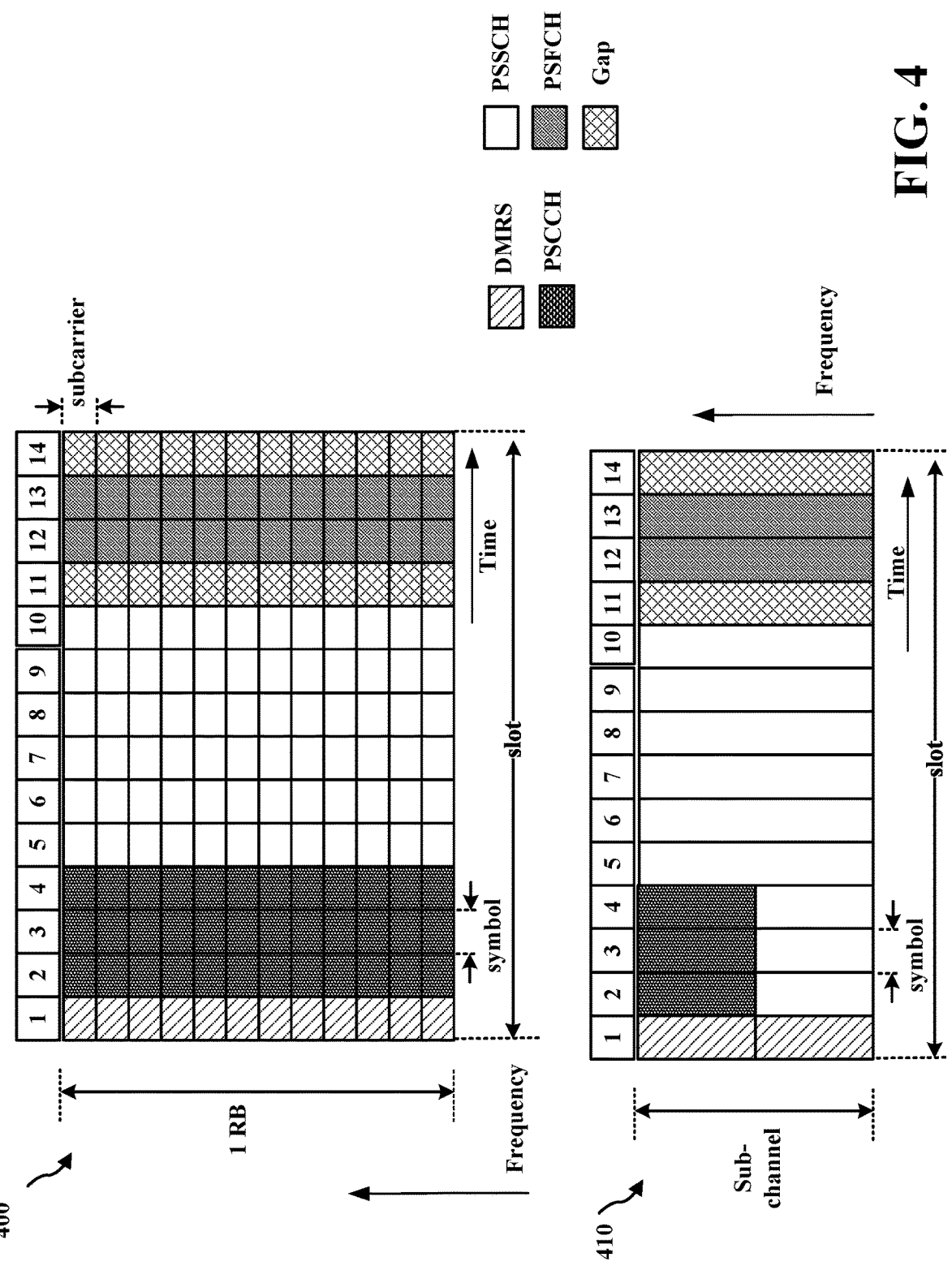
FIG. 4 illustrates example aspects of a sidelink slot structure.

FIG. 4 includes diagrams 400 and 410 illustrating example aspects of slot structures that may be used for sidelink communication (e.g., between UEs 104, RSU 107, etc.). The slot structure may be within a 5G/NR frame structure in some examples. In other examples, the slot structure may be within an LTE frame structure. Although the following description may be focused on 5G NR, the concepts described herein may be applicable to other similar areas, such as LTE, LTE-A, CDMA, GSM, and other wireless technologies. The example slot structure in FIG. 4 is merely one example, and other sidelink communication may have a different frame structure and/or different channels for sidelink communication. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 400 illustrates a single resource block of a single slot transmission, e.g., which may correspond to a 0.5 ms transmission time interval (TTI). A physical sidelink control channel may be configured to occupy multiple physical resource blocks (PRBs), e.g., 10, 12, 15, 20, or 25 PRBs. The PSCCH may be limited to a single sub-channel. A PSCCH duration may be configured to be 2 symbols or 3 symbols, for example. A sub-channel may include 10, 15, 20, 25, 50, 75, or 100 PRBs, for example. The resources for a sidelink transmission may be selected from a resource pool including one or more subchannels. As a non-limiting example, the resource pool may include between 1-27 subchannels. A PSCCH size may be established for a resource pool, e.g., as between 10-100% of one subchannel for a duration of 2 symbols or 3 symbols. The diagram 410 in FIG. 4 illustrates an example in which the PSCCH occupies about 50% of a subchannel, as one example to illustrate the concept of PSCCH occupying a portion of a subchannel. The physical sidelink shared channel (PSSCH) occupies at least one subchannel. The PSCCH may include a first portion of sidelink control information (SCI), and the PSSCH may include a second portion of SCI in some examples.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 4, some of the REs may include control information in PSCCH and some REs may include demodulation RS (DMRS). At least one symbol may be used for feedback. FIG. 4 illustrates examples with two symbols for a physical sidelink feedback channel (PSFCH) with adjacent gap symbols. A symbol prior to and/or after the feedback may be used for turnaround between reception of data and transmission of the feedback. The gap enables a device to switch from operating as a transmitting device to prepare to operate as a receiving device, e.g., in the following slot. Data may be transmitted in the remaining REs, as illustrated. The data may include the data message described herein. The position of any of the data, DMRS, SCI, feedback, gap symbols, and/or LBT symbols may be different than the example illustrated in FIG. 4. Multiple slots may be aggregated together in some aspects.

Figure 5:
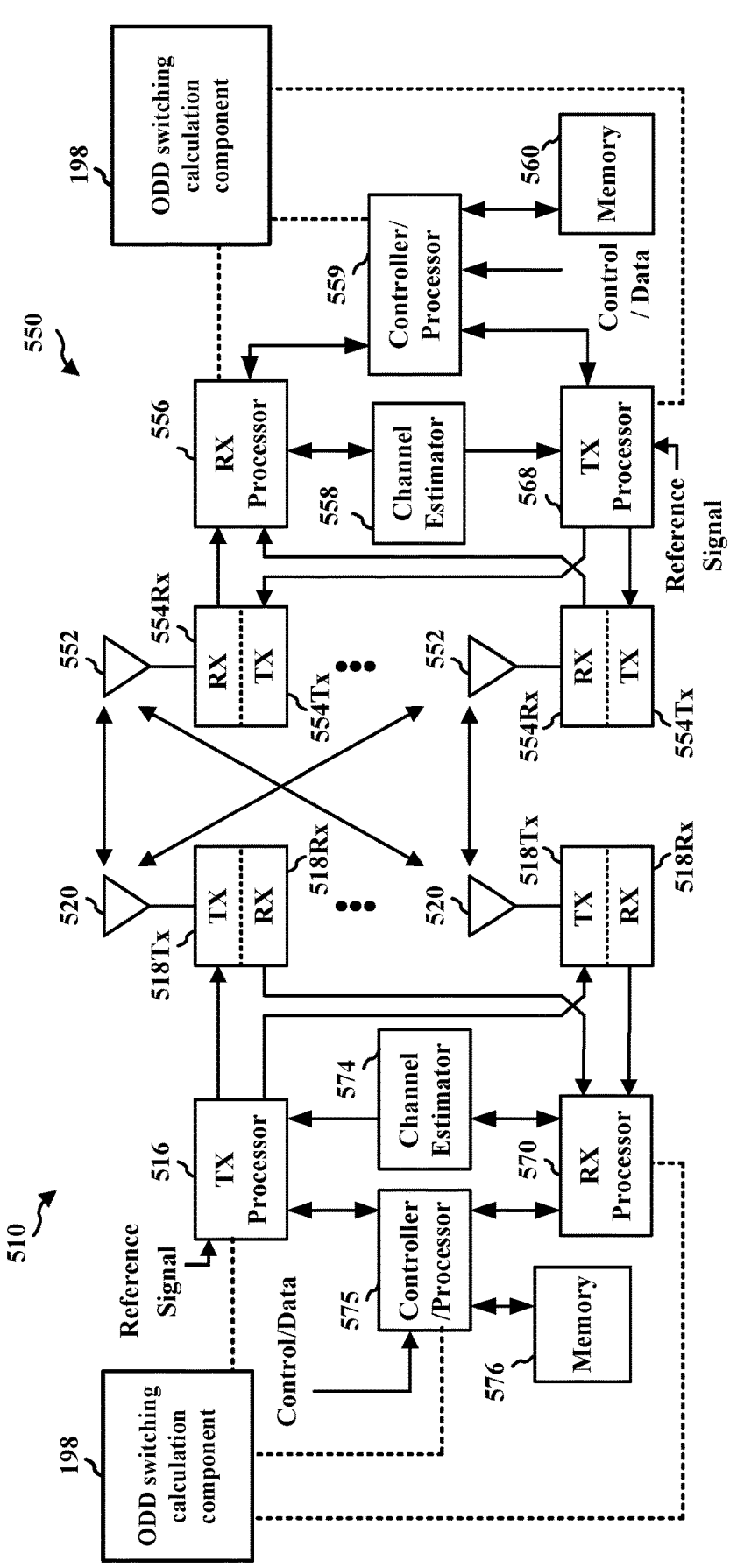
FIG. 5 is a diagram illustrating an example of a first device and a second device involved in wireless communication based, e.g., on sidelink.

FIG. 5 is a block diagram of a wireless communication device 510 in communication with a wireless communication device 550 based on sidelink. The wireless communication device 510 may be a UE, an RSU, or a base station. The wireless communication device 550 may be a UE, an RSU, or a base station. In some examples, the wireless communication device 510 and wireless communication device 550 may communicate based on V2X or other D2D communication. The communication may be based on sidelink using a PC5 interface. Packets may be provided to a controller/processor 575 that implements layer 3 and layer 2 functionality. Layer 3 includes an RRC layer, and layer 2 includes a PDCP layer, an RLC layer, and a MAC layer.

The TX processor 516 and the RX processor 570 implement layer 1 functionality associated with various signal processing functions. Layer 1, which includes a PHY layer, may include error detection on the transport channels, FEC coding/decoding of the transport channels, interleaving, rate matching, mapping onto physical channels, modulation/demodulation of physical channels, and MIMO antenna processing. The TX processor 516 handles mapping to signal constellations based on various modulation schemes (e.g., BPSK, QPSK, M-PSK, M-QAM). The coded and modulated symbols may then be split into parallel streams. Each stream may then be mapped to an OFDM subcarrier, multiplexed with a reference signal (e.g., pilot) in the time and/or frequency domain, and then combined together using an IFFT to produce a physical channel carrying a time domain OFDM symbol stream. The OFDM stream is spatially precoded to produce multiple spatial streams. Channel estimates from a channel estimator 574 may be used to determine the coding and modulation scheme, as well as for spatial processing. The channel estimate may be derived from a reference signal and/or channel condition feedback transmitted by the wireless communication device 550. Each spatial stream may then be provided to a different antenna 520 via a separate transmitter 518Tx. Each transmitter 518Tx may modulate an RF carrier with a respective spatial stream for transmission.

At the wireless communication device 550, each receiver 554Rx receives a signal through its respective antenna 552. Each receiver 554Rx recovers information modulated onto an RF carrier and provides the information to the RX processor 556. The TX processor 568 and the RX processor 556 implement layer 1 functionality associated with various signal processing functions. The RX processor 556 may perform spatial processing on the information to recover any spatial streams destined for the wireless communication device 550. If multiple spatial streams are destined for the wireless communication device 550, they may be combined by the RX processor 556 into a single OFDM symbol stream. The RX processor 556 then converts the OFDM symbol stream from the time-domain to the frequency domain using a FFT. The frequency domain signal includes a separate OFDM symbol stream for each subcarrier of the OFDM signal. The symbols on each subcarrier, and the reference signal, are recovered and demodulated by determining the most likely signal constellation points transmitted by the wireless communication device 510. These soft decisions may be based on channel estimates computed by the channel estimator 558. The soft decisions are then decoded and deinterleaved to recover the data and control signals that were originally transmitted by the wireless communication device 510 on the physical channel. The data and control signals are then provided to the controller/processor 559, which implements layer 3 and layer 2 functionality.

The controller/processor 559 can be associated with at least one memory 560 that stores program codes and data. The at least one memory 560 may be referred to as a computer-readable medium. In the UL, the controller/processor 559 provides demultiplexing between transport and logical channels, packet reassembly, deciphering, header decompression, and control signal processing to recover IP packets. The controller/processor 559 is also responsible for error detection using an ACK and/or NACK protocol to support HARQ operations.

Similar to the functionality described in connection with the transmission by the wireless communication device 510, the controller/processor 559 may provide RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 558 from a reference signal or feedback transmitted by the wireless communication device 510 may be used by the TX processor 568 to select the appropriate coding and modulation schemes, and to facilitate spatial processing. The spatial streams generated by the TX processor 568 may be provided to different antenna 552 via separate transmitters 554Tx. Each transmitter 554Tx may modulate an RF carrier with a respective spatial stream for transmission.

The transmission is processed at the wireless communication device 510 in a manner similar to that described in connection with the receiver function at the wireless communication device 550. Each receiver 518Rx receives a signal through its respective antenna 520. Each receiver 518Rx recovers information modulated onto an RF carrier and provides the information to a RX processor 570.

The controller/processor 575 can be associated with at least one memory 576 that stores program codes and data. The at least one memory 576 may be referred to as a computer-readable medium. The controller/processor 575 provides demultiplexing between transport and logical channels, packet reassembly, deciphering, header decompression, control signal processing to recover IP packets. The controller/processor 575 is also responsible for error detection using an ACK and/or NACK protocol to support HARQ operations.

At least one of the TX processor 568, the RX processor 556, and the controller/processor 559 may be configured to perform aspects in connection with the ODD switching calculation component 198 of FIG. 1.

At least one of the TX processor 516, the RX processor 570, and the controller/processor 575 may be configured to perform aspects in connection with the ODD switching calculation component 198 of FIG. 1.

Figure 6:
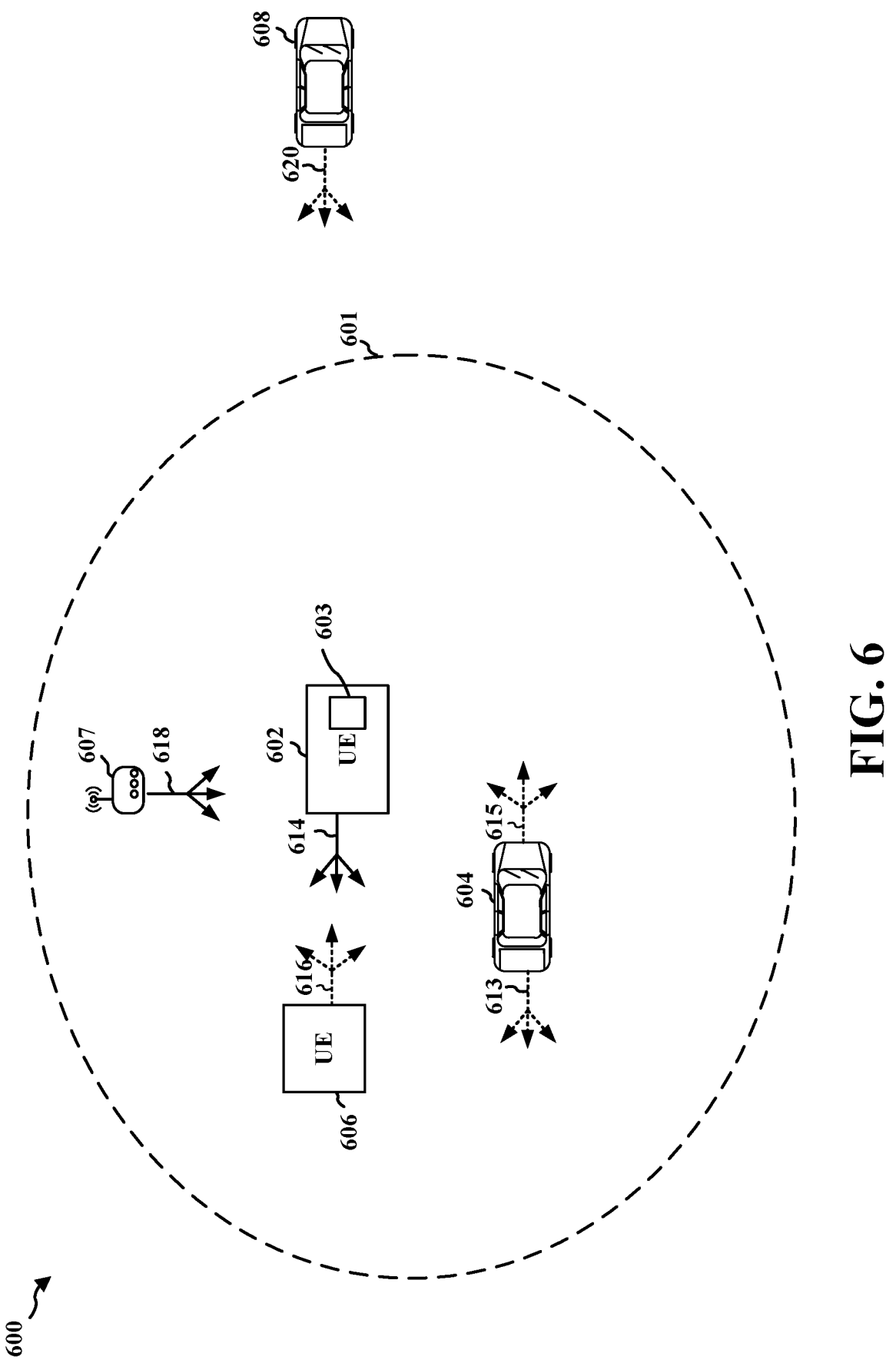
FIG. 6 illustrates an example of sidelink communication between devices, in accordance with aspects presented herein.

FIG. 6 illustrates an example 600 of sidelink communication between devices. The communication may be based on a slot structure including aspects described in connection with FIG. 4. For example, the UE 602 may transmit a transmission 614, e.g., including a control channel (e.g., PSCCH) and/or a corresponding data channel (e.g., PSSCH), that may be received by UEs 604, 606, 608. A control channel may include information (e.g., sidelink control information (SCI)) for decoding the data channel including reservation information, such as information about time and/or frequency resources that are reserved for the data channel transmission. For example, the SCI may indicate a number of TTIs, as well as the RBs that will be occupied by the data transmission. The SCI may also be used by receiving devices to avoid interference by refraining from transmitting on the reserved resources. The UEs 602, 604, 606, 608 may each be capable of sidelink transmission in addition to sidelink reception. Thus, UEs 604, 606, 608 are illustrated as transmissions 613, 615, 616, 620. The transmissions 613, 614, 615, 616, 620 may be unicast, broadcast or multicast to nearby devices. For example, UE 604 may transmit transmissions 613, 615 intended for receipt by other UEs within a range 601 of UE 604, and UE 606 may transmit transmissions 616. In some aspects, the RSU 607 may receive communication from and/or transmit communication 618 to UEs 602, 604, 606, 608. One or more of the UEs 602, 604, 606, 608 may include an ODD switching calculation component 198 as described in connection with FIG. 1. The RSU 607 may include a route attribute aggregation component 199 as described in connection with FIG. 1.

Sidelink communication may be based on different types or modes of resource allocation mechanisms. In a first resource allocation mode (which may be referred to herein as "Mode 1"), centralized resource allocation may be provided by a network entity. For example, a base station 102 may determine resources for sidelink communication and may allocate resources to different UEs 104 to use for sidelink transmissions. In this first mode, a UE receives the allocation of sidelink resources from the base station 102. In a second resource allocation mode (which may be referred to herein as "Mode 2"), distributed resource allocation may be provided. In Mode 2, each UE may autonomously determine resources to use for sidelink transmission. In order to coordinate the selection of sidelink resources by individual UEs, each UE may use a sensing technique to monitor for resource reservations by other sidelink UEs and may select resources for sidelink transmissions from unreserved resources. Devices communicating based on sidelink, may determine one or more radio resources in the time and frequency domain that are used by other devices in order to select transmission resources that avoid collisions with other devices.

The sidelink transmission and/or the resource reservation may be periodic or aperiodic, where a UE may reserve resources for transmission in a current slot and up to two future slots (discussed below).

Thus, in the second mode (e.g., Mode 2), individual UEs may autonomously select resources for sidelink transmission, e.g., without a central entity such as a base station indicating the resources for the device. A first UE may reserve the selected resources in order to inform other UEs about the resources that the first UE intends to use for sidelink transmission(s).

In some examples, the resource selection for sidelink communication may be based on a sensing-based mechanism. For instance, before selecting a resource for a data transmission, a UE may first determine whether resources have been reserved by other UEs.

For example, as part of a sensing mechanism for resource allocation mode 2, the UE may determine (e.g., sense) whether the selected sidelink resource has been reserved by other UE(s) before selecting a sidelink resource for a data transmission. If the UE determines that the sidelink resource has not been reserved by other UEs, the UE may use the selected sidelink resource for transmitting the data, e.g., in a PSSCH transmission. The UE may estimate or determine which radio resources (e.g., sidelink resources) may be in-use and/or reserved by others by detecting and decoding sidelink control information (SCI) transmitted by other UEs. The UE may use a sensing-based resource selection algorithm to estimate or determine which radio resources are in-use and/or reserved by others. The UE may receive SCI from another UE that includes reservation information based on a resource reservation field of the SCI. The UE may continuously monitor for (e.g., sense) and decode SCI from peer UEs. The SCI may include reservation information, e.g., indicating slots and RBs that a particular UE has selected for a future transmission. The UE may exclude resources that are used and/or reserved by other UEs from a set of candidate resources for sidelink transmission by the UE, and the UE may select/reserve resources for a sidelink transmission from the resources that are unused and therefore form the set of candidate resources. The UE may continuously perform sensing for SCI with resource reservations in order to maintain a set of candidate resources from which the UE may select one or more resources for a sidelink transmission. Once the UE selects a candidate resource, the UE may transmit SCI indicating its own reservation of the resource for a sidelink transmission. The number of resources (e.g., sub-channels per subframe) reserved by the UE may depend on the size of data to be transmitted by the UE. Although the example is described for a UE receiving reservations from another UE, the reservations may also be received from an RSU or other device communicating based on sidelink.

In some aspects, a UE 602 may have a set of sensors 603 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning) configured to sense a set of attributes about a vehicle associated with the UE 602. The set of sensors 603 may sense a speed of the vehicle (e.g., mph, kph), a weather pattern (e.g., humidity, wind speed, amount of rainfall), a road feature (e.g., presence/ absence of a physical barrier along a road), and/or a road attribute (e.g., how many lanes in a road, which lane the vehicle is in). The UE 602 may adjust an autonomous driving system based on sensor information from the set of sensors 603, for example determining whether the UE 602 is within an ODD associated with the autonomous driving system, activating the autonomous driving system when the UE 602 is within an ODD, and deactivating the autonomous driving system when the UE 602 is not within an ODD.

Figure 7:
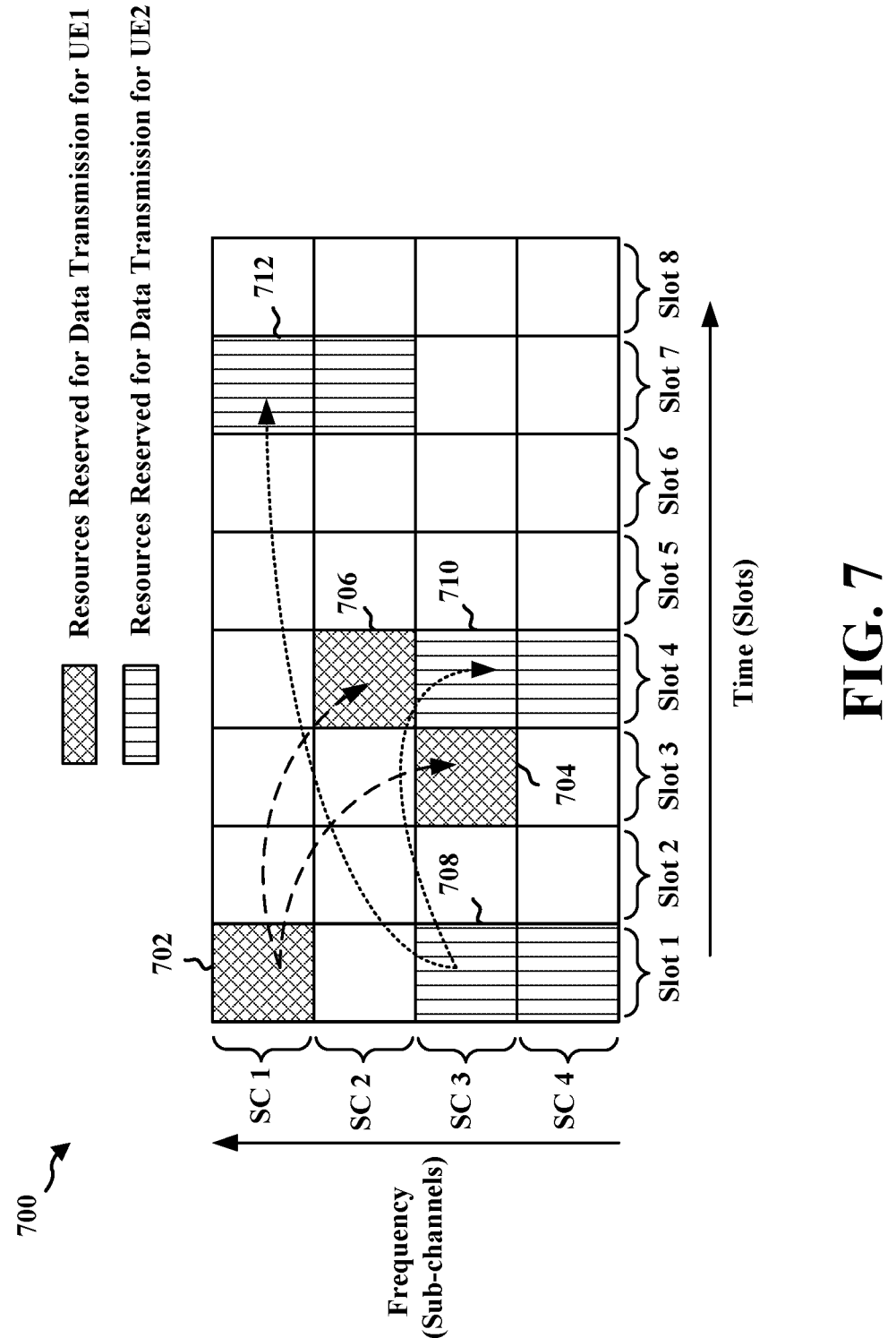
FIG. 7 illustrates examples of resource reservation for sidelink communication.

FIG. 7 is an example 700 of time and frequency resources showing reservations for sidelink transmissions. The resources may be included in a sidelink resource pool, for example. The resource allocation for each UE may be in units of one or more sub-channels in the frequency domain (e.g., sub-channels SC1 to SC 4), and may be based on one slot in the time domain. The UE may also use resources in the current slot to perform an initial transmission, and may reserve resources in future slots for retransmissions. In this example, two different future slots are being reserved by UE1 and UE2 for retransmissions. The resource reservation may be limited to a window of a pre-defined slots and sub-channels, such as an 8 time slots by 4 sub-channels window as shown in example 700, which provides 32 available resource blocks in total. This window may also be referred to as a resource selection window.

A first UE ("UE1) may reserve a sub-channel (e.g., SC 1) in a current slot (e.g., slot 1) for a data transmission 702, and may reserve additional future slots within the window for data retransmissions (e.g., data retransmission 704 and data retransmission 706). For example, UE1 may reserve sub-channels SC 3 at slots 3 and SC 2 at slot 4 for future retransmissions as shown by FIG. 4. UE1 then transmits information regarding which resources are being used and/or reserved by it to other UE(s). UE1 may do by including the reservation information in the reservation resource field of the SCI, e.g., a first stage SCI.

FIG. 7 illustrates that a second UE ("UE2") reserves resources in sub-channels SC 3 and SC 4 at time slot 1 for a data transmission 708, and reserves a data transmission 710 at time slot 4 using sub-channels SC 3 and SC 4, and reserves a data transmission 712 at time slot 7 using sub-channels SC 1 and SC 2 as shown by FIG. 7. Similarly, UE2 may transmit the resource usage and reservation information to other UE(s), such as using the reservation resource field in SCI.

A third UE may consider resources reserved by other UEs within the resource selection window to select resources to transmit its data. The third UE may first decode SCIs within a time period to identify which resources are available (e.g., candidate resources). For example, the third UE may exclude the resources reserved by UE1 and UE2 and may select other available sub-channels and time slots from the candidate resources for its transmission and retransmissions, which may be based on a number of adjacent sub-channels in which the data (e.g., packet) to be transmitted can fit.

While FIG. 7 illustrates resources being reserved for an initial transmission and two retransmissions, the reservation may be for an initial transmission and a single transmission or for an initial transmission.

The UE may determine an associated signal measurement (such as RSRP) for each resource reservation received by another UE. The UE may consider resources reserved in a transmission for which the UE measures an RSRP below a threshold to be available for use by the UE. A UE may perform signal/channel measurement for a sidelink resource that has been reserved and/or used by other UE(s), such as by measuring the RSRP of the message (e.g., the SCI) that reserves the sidelink resource. Based at least in part on the signal/channel measurement, the UE may consider using/ reusing the sidelink resource that has been reserved by other UE(s). For example, the UE may exclude the reserved resources from a candidate resource set if the measured RSRP meets or exceeds the threshold, and the UE may consider a reserved resource to be available if the measured RSRP for the message reserving the resource is below the threshold. The UE may include the resources in the candidate resources set and may use/reuse such reserved resources when the message reserving the resources has an RSRP below the threshold, because the low RSRP indicates that the other UE is distant and a reuse of the resources is less likely to cause interference to that UE. A higher RSRP indicates that the transmitting UE that reserved the resources is potentially closer to the UE and may experience higher levels of interference if the UE selected the same resources.

For example, in a first step, the UE may determine a set of candidate resources (e.g., by monitoring SCI from other UEs and removing resources from the set of candidate resources that are reserved by other UEs in a signal for which the UE measures an RSRP above a threshold value). In a second step, the UE may select N resources for transmissions and/or retransmissions of a TB. As an example, the UE may randomly select the N resources from the set of candidate resources determined in the first step. In a third step, for each transmission, the UE may reserve future time and frequency resources for an initial transmission and up to two retransmissions. The UE may reserve the resources by transmitting SCI indicating the resource reservation. For example, in the example in FIG. 7, the UE may transmit SCI reserving resources for data transmissions 708, 710, and 712.

Figure 8:
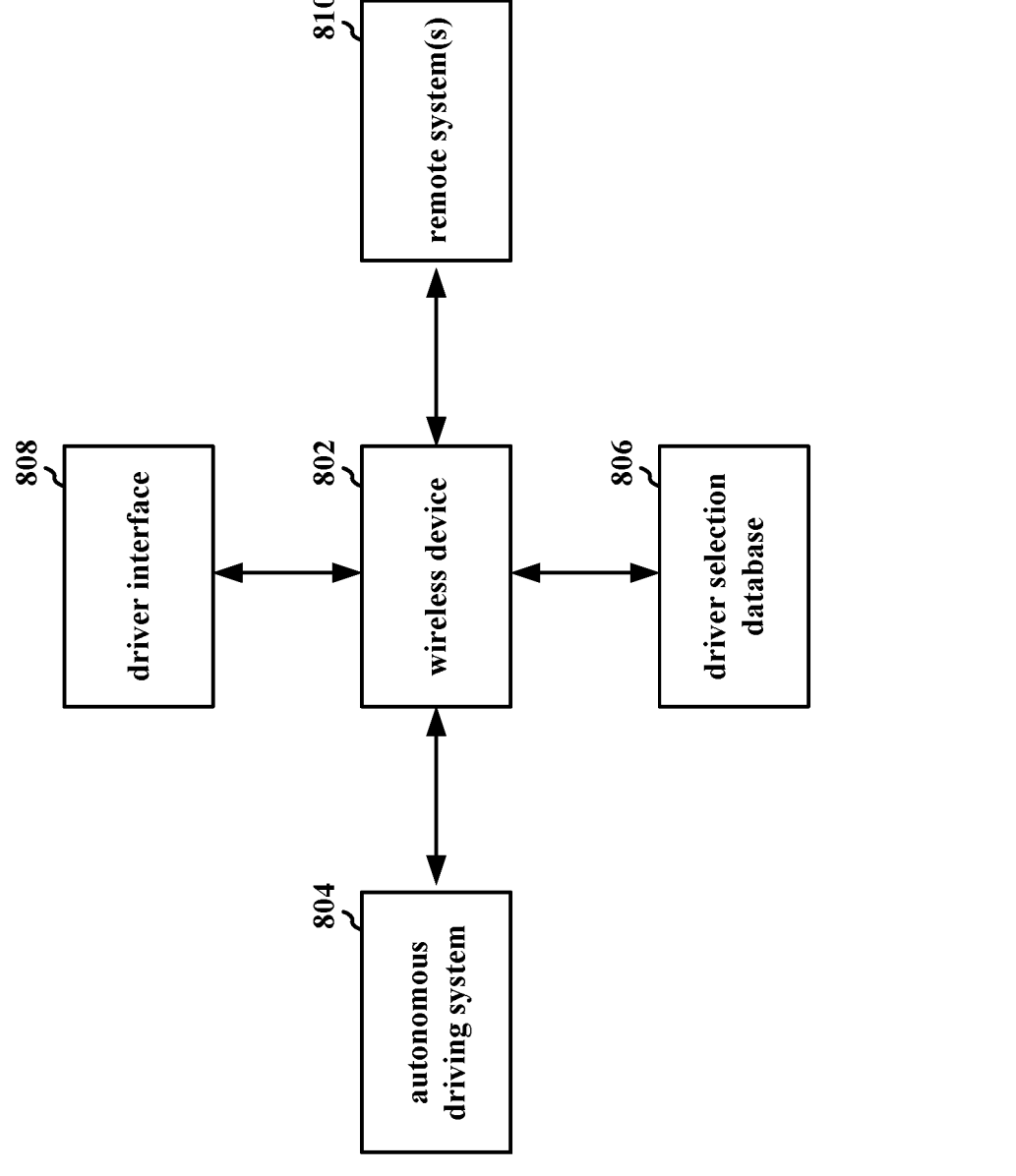
FIG. 8 illustrates an example of communication between devices for an automated driver system to dynamically adjust for calculated ODD conditions.

FIG. 8 is a diagram 800 that illustrates a wireless device 802 configured to dynamically make adjustments for an ODD condition to an autonomous driving system 804. The wireless device 802 may transmit a query to the autonomous driving system 804 to determine a set of ODD attributes associated with an ODD condition for the autonomous driving system 804. For example, the autonomous driving system 804 may have an autonomous driving (AD) system or an advanced driver assistance system (ADAS) that defines a set of ODD attributes associated with the ODD of the autonomous driving system 804. The set of ODD attributes may include, for example, a range of speed associated with the vehicle (e.g., between 20 mph and 60 mph), a road attribute associated with the vehicle (e.g., at least three lanes in a single direction along the route), a road position associated with the vehicle (e.g., not positioned in a rightmost or a leftmost lane in a road having at least three lanes traveling in a single direction along the route), a proximity to a road feature (e.g., not within 100 m of a pedestrian crossing, a traffic signal, or a stop sign), a weather attribute (e.g., no rain, no fog), or a road feature (e.g., a physical divider separating the lane that the vehicle is in and a lane having oncoming traffic). In response to receiving the set of ODD attributes, the wireless device 802 may determine what attributes define what is, and is not, an ODD for the autonomous driving system 804. The wireless device 802 may communicate with the autonomous driving system 804 via a wired connection (e.g., a universal serial bus (USB) plug) or a wireless connection (e.g., a Bluetooth connection).

The wireless device 802 may wirelessly communicate with a set of remote systems 810 to retrieve a set of attributes associated with a route of the wireless device 802. For example, the wireless device 802 may connect with other vehicles to obtain a set of attributes associated with the route of the wireless device 802. In another example, the wireless device 802 may connect with other infrastructure (e.g., a weather database, a map database, an RSU) to obtain a set of attributes associated with the route of the wireless device 802. In another example, the wireless device 802 may connect with a cloud server (e.g., a data aggregator) to obtain a set of attributes associated with the route of the wireless device 802. In one aspect, the wireless device 802 may receive a navigation map from a map aggregation server. The navigation map may include a set of attributes associated with vehicles in an area, for example an average speed of vehicles on a road, a number of vehicles on a road, a road condition (e.g., road closed, road construction), a traffic accident condition, and/or an emergency condition (e.g., a flood, a lane closed). In another aspect, the wireless device 802 may receive a weather report map from a weather monitoring server. The weather report may include a set of attributes associated with weather states in an area, for example a current or predicted temperature or a weather pattern (e.g., foggy, rainy, humidity, chance of precipitation). In some aspects, the wireless device 802 may aggregate data from a plurality of remote systems to obtain a set of attributes associated with the route of the wireless device 802, and may disregard attributes associated with a time stamp that falls outside a range, for example data more than a half an hour or more than an hour old. A set of attributes may be associated with a time-stamp to determine whether the information is considered "real-time" (e.g., less than 10 minutes old, less than 30 minutes old). In some aspects, the wireless device 802 may retrieve data from the set of remote systems 810 via sidelink (e.g., a V2X system), via Uu (e.g., a base station), or Wi-Fi (e.g., an AP or a STA).

The wireless device 802 may query a set of driver selections associated with a driver of the vehicle associated with the wireless device 802 from a driver selection database 806. The driver selection database 806 may be configured to retrieve a set of driver selections/attributes associated with a driver of the vehicle, for example a selection of whether the wireless device 802 notifies the driver of the ODD condition in response to a calculated number of ODD switches being greater or equal to a threshold value or whether the wireless device 802 deactivates an ODD mode associated with the wireless device 802 in response to the calculated number of ODD switches being greater or equal to a threshold value. In some aspects, the wireless device 802 may be configured to retrieve a set of driver selections/attributes from the driver selection database based on a sensor of the vehicle, for example a camera (e.g., applying an image to facial recognition software) or an RFID sensor (e.g., retrieving an ID of an RFID chip associated with the driver). The wireless device 802 may include a state machine or an artificial intelligence (AI) model that calculates a predicted number of ODD switches along the route associated of the wireless device 802 based on the set of attributes and the driver selections associated with the driver of the vehicle. The wireless device 802 may then make a recommendation to the driver of the vehicle via the driver interface 808, for example a touch screen device or a speaker and a microphone of the vehicle, informing the driver that an ODD condition is detected. The wireless device 802 may receive a response from the driver, for example an instruction to deactivate the autonomous driving system 804 for a period of time, or an instruction to activate the autonomous driving system 804 for a period of time. In some aspects, the wireless device 802 may automatically deactivate the autonomous driving system 804 for a period of time based on determining that the calculated predicted number of ODD switches is greater or equal to a threshold value for a portion of the route of the wireless device 802.

Figure 9:
FIG. 9 illustrates an example of communication between devices to dynamically adjust for calculated ODD conditions, in accordance with aspects presented herein.

FIG. 9 illustrates a diagram 900 of an example of communication between devices to enable dynamic calculation of ODD conditions for a UE 902. While the UE 902 is shown as a vehicle, the UE 902 may be a wireless device associated with a vehicle having an autonomous driving system (ADS) or an ADAS for example a UE that is connected to a vehicle via a wireless connection (e.g., Wi-Fi, Bluetooth) or via a wired connection (e.g., a universal serial bus (USB) connector). The communication between the devices may be based on a slot structure including aspects described in connection with FIGS. 2A-2D and/or FIG. 4.

The UE 902 may have a set of sensors 904, configured to obtain a set of attributes associated with the UE 902, for example a speed of the UE 902, an orientation of the UE 902, a lane that the UE 902 is in, a location of the UE 902, a number of cars in areas about the UE 902 (e.g., in a left lane, in a right lane, in front of the UE 902), a weather condition about the UE 902 (e.g., a temperature, a humidity, whether windshield wipers are on), etc. The set of sensors 904 may include, for example a motion sensor, a pressure sensor, a camera, a microphone, an altimeter, an IMU, an accelerometer, a LIDAR device, a RADAR device, a SONAR device, a magnetometer, and/or a GNSS device. In some aspects, the UE 902 may save a set of attributes from sensors over a period of time, for example for 5 minutes, 10 minutes, or 30 minutes, to collect route information. For example, the UE 902 may incrementally save its speed while driving on a route, which may indicate how many times the UE 902 increased its speed over a threshold speed or under a threshold speed while traveling from a first point to a second point. This may allow the UE 902, or another UE receiving the saved set of attributes, to calculate a number of ODD switches along a route. In some aspects, the UE 902 may receive a set of attributes from other UEs, for example the UE 910 via the set of transmissions 912. The set of transmissions 912 may be, for example, V2X signals, such as sidelink transmissions, or may be other wireless signals, for example Wi-Fi, Bluetooth, or radio transmissions. In some aspects, the UE 902 may receive a set of attributes from an RSU 914 via the set of transmissions 916. The set of transmissions 916 may be, for example, sidelink transmissions, Uu transmissions, Wi-Fi, or Bluetooth transmissions. The RSU 914 may be configured to communicate with UEs within a zone 901 associated with the RSU 914. In some aspects, the RSU 914 may be configured to aggregate a set of attributes associated with the zone 901 from UEs within the zone (e.g., from the UE 910 via the set of transmissions 912 and from the UE 902 via the set of transmissions 906), and may be configured to transmit the aggregated set of attributes as the set of transmissions 916. In some aspects, one or more of the UEs may be configured to periodically transmit a set of attributes to the RSU 914 for aggregation, for example once every 10 seconds or once every 30 seconds, allowing the RSU 914 to aggregate a set of attributes from a plurality of UEs within a zone of the RSU 914. In some aspects, the RSU 914 may be configured to periodically transmit an aggregated set of attributes to UEs within the zone 901, for example once every 10, 30, or 60 seconds. In some aspects, a UE may be configured to transmit attributes in response to receiving a periodic transmission from the RSU 914. For example, in response to receiving a periodic transmission of aggregated attributes from the RSU 914 as the set of transmissions 916, the UE 910 may periodically transmit set of attributes associated with its route to the RSU 914 for aggregation and distribution to other UEs within the zone 901. In some aspects, the UE 902 may receive a set of attributes from the base station 918 via the set of transmissions 920. The base station 918 may aggregate attributes from a plurality of UEs, for example from the UE 902 via the set of transmissions 908 and via the UE 910 via the set of transmissions 913. The set of transmissions 908 may be of a different type than the set of transmissions 906. For example, the set of transmissions 906 may include sidelink transmissions while the set of transmissions 908 may include Uu transmissions. The set of transmissions 913 may be of a different type than the set of transmissions 912. For example, the set of transmissions 912 may include sidelink transmissions while the set of transmissions 913 may include Uu transmissions. In other words, a UE may transmit a set of attributes associated with its route to devices via a first type, a second type, or a first and a second type, for aggregation by a distributing entity, such as the RSU 914 or the base station 918. The base station 918 may aggregate a set of attributes from a plurality of UEs, for example UEs that the base station 918 serves, and may transmit the aggregated set of attributes as the set of transmissions 920. The base station 918 may periodically transmit the aggregated set of attributes as the set of transmissions 920. The UE 902 and/or the UE 910 may periodically transmit a set of attributes associated with its route as the set of transmissions 908 and/or the set of transmissions 913, respectively. In some aspects, a UE may transmit attributes associated with its route in response to receiving the set of transmissions 920 from the base station 918. In some aspects, the UE 902 may retrieve a set of attributes from a data repository 922. The data repository 922 may be, for example, a map aggregation server having traffic information associated with an area about the UE 902 or a weather monitoring server having weather information associated with an area about the UE 902. The data repository 922 may be accessible via a network connection, for example via an Internet connection, a Uu connection with the base station 918, or a sidelink connection with the RSU 914.

The UE 902 may obtain attributes associated with a route of the UE 902 via any combination of the methods described above, for example by obtaining attributes using the set of sensors 904, by receiving attributes from the set of transmissions 912 from the UE 910, by receiving attributes from the set of transmissions 916 from the RSU 914, by receiving attributes from the set of transmissions 920 from the base station 918, or by receiving attributes from the data repository 922 (e.g., via an Internet connection). The UE 902 may transmit a query for attributes associated with a specific route, or the UE 902 may receive a set of attributes associated with an area about the UE 902 (e.g., the zone 901 of the RSU 914, a serving cell of the base station 918) and may filter out attributes that are not associated with a route of the UE 902. The UE 902 may calculate a predicted number of ODD switches along the route based on the set of attributes associated with the route of the UE 902, allowing the UE 902 to take appropriate action, for example by notifying a driver of the UE 902 of an ODD condition (e.g., that the UE 902 is predicted to switch its ODD more than a threshold number of times for a distance or for a time period) or by deactivating an ODD mode associated with the UE 902. In some aspects, the UE 902 may be configured to reactivate the ODD mode associated with the UE 902 in response to calculating that the predicted number of ODD switches along a second route of the UE 902 is less than or equal to a threshold value. In some aspects, the UE 902 may be configured to notify the driver of the UE 902 of a second ODD condition (e.g., that the UE 902 is predicted to not switch its ODD more than a threshold number of times for a distance or for a time period).

Figure 10:
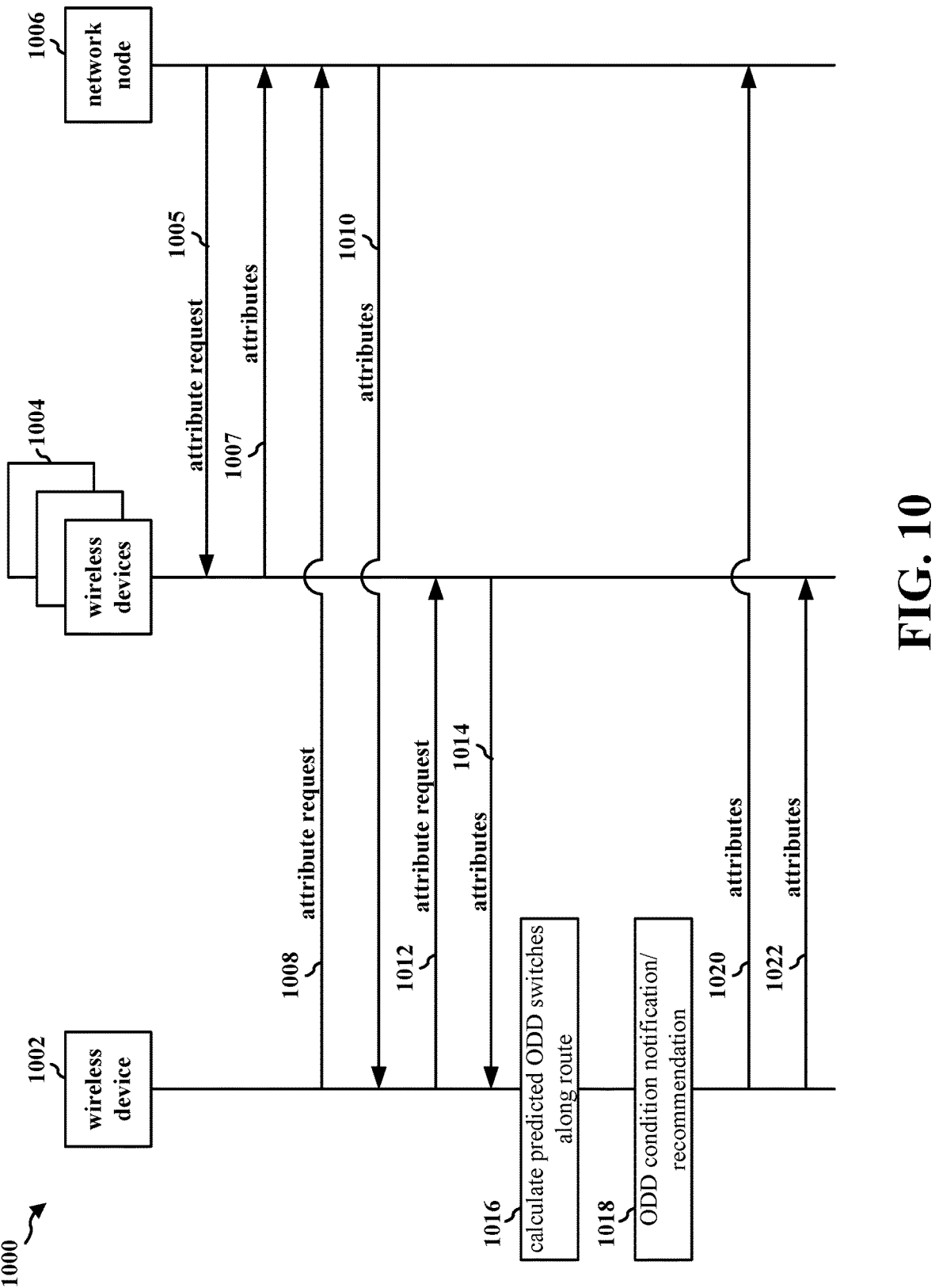
FIG. 10 illustrates an example of a communications flow diagram for a wireless device configured to dynamically adjust for calculated ODD conditions.

FIG. 10 is a communications flow diagram 1000 for a wireless device 1002 configured to dynamically make adjustments for an ODD condition based on a set of attributes associated with a route of the wireless device 1002. The wireless device 1002 may be a vehicle, or may be a UE associated with a vehicle (e.g., connected to the vehicle via a wired or wireless connection). In some aspects, the wireless device 1002 may be configured to activate or deactivate an ODD mode of the vehicle (e.g., shut off the ability of the vehicle to turn on or off ODD). In some aspects, the wireless device 1002 may be configured to notify a driver of the vehicle of an ODD condition, for example by displaying an ODD condition to a screen of the vehicle or by announcing the ODD condition to a speaker of the vehicle. The set of wireless devices 1004 may include other UEs that collect sets of attributes associated with their routes. For example, the set of wireless devices 1004 may include a vehicle with a set of sensors that collects the speed of the vehicle and the GPS coordinates of the vehicle over time. The vehicle may transmit the set of attributes associated with its route via one or more transmission formats, for example via a Uu transmission (e.g., PUSCH) or a sidelink transmission (e.g., PSSCH). The network node 1006 may include a base station, a TRP, or an RSU. The network node 1006 may be configured to aggregate a set of attributes from a plurality of devices (e.g., a subset of the set of wireless devices 1004, a data repository) to transmit to the wireless device 1002. The network node 1006 may transmit the set of attributes to the wireless device 1002 via one or more transmission formats, for example via a Uu transmission (e.g., PDSCH) or a sidelink transmission (e.g., PSSCH).

The network node 1006 may transmit a request 1005 for a set of attributes to the set of wireless devices 1004. The set of wireless devices 1004 may receive the request 1005 from the network node 1006. The request 1005 may be a broadcast or a unicast transmission. The network node 1006 may transmit the request 1005 as a sidelink transmission, for example a PSSCH transmission to a set of UEs. The network node 1006 may transmit the request 1005 as a Uu transmission, for example a PDSCH transmission to a set of UEs.

The request 1005 may include an indicator of a set of wireless devices (e.g., a set of UE IDs) or an indicator of a location (e.g., a zone ID, a cell ID, an identifier of a route). The set of wireless devices 1004 may transmit a set of attributes 1007 to the network node 1006. The network node 1006 may receive the set of attributes 1007 from the set of wireless devices 1004. In some aspects, the set of wireless devices 1004 may transmit the set of attributes 1007 based on the request 1005. For example, the set of wireless devices 1004 may select a subset of collected attributes based on the request 1005 (e.g., transmit attributes associated with a route indicated by the request 1005, transmit attributes associated with a zone indicated by the request 1005). In some aspects, the set of wireless devices 1004 may periodically transmit the set of attributes 1007, for example by transmitting a set of attributes associated with its route (e.g., transmitting attributes of its route for the previous 5 minutes every 5 minutes). The set of attributes 1007 may include attributes collected by the set of wireless devices 1004, for example a speed metric (e.g., how fast the vehicle was going during a period of time or while traveling on a route), an ODD switching metric (e.g., how many times the ODD of the vehicle switched during a period of time or while traveling on a route), a driver override metric (e.g., how many times a driver took control of the vehicle when the ODD was turned on during a period of time or while traveling on a route), a weather metric (e.g., whether fog lights were activated, whether windshield wipers were activated, a barometric pressure metric, a humidity metric), a road attribute (e.g., whether a lane was closed, a bumpiness metric of the road, a speed while traveling along a section of road), a road feature (e.g., whether the road has a pedestrian crosswalk, whether the road has a traffic light).

In other words, the set of attributes 1007 may include a set of vehicle movement attributes (locations, speeds, weather conditions, road conditions, and/or number of ODD switches) that a UE has been collecting associated with a route that the UE has been traveling. The set of wireless devices 1004 may transmit the set of attributes 1007 as a sidelink transmission, for example a PSSCH transmission to an RSU. The set of wireless devices 1004 may transmit the set of attributes 1007 as a Uu transmission, for example a PUSCH transmission to a TRP. The network node 1006 may aggregate the set of attributes 1007.

In some aspects, the wireless device 1002 may transmit a request 1008 to the network node 1006. The network node 1006 may receive the request 1008 from the wireless device 1002. The request 1008 may be a broadcast transmission (e.g., to all RSUs or all TRPs that may receive the request 1008) or a unicast transmission (to specific RSUs or to specific TRPs). The wireless device 1002 may transmit the request 1008 as a sidelink transmission, for example a PSSCH transmission to an RSU. The wireless device 1002 may transmit the request 1008 as a Uu transmission, for example a PUSCH transmission to a TRP.

The request 1008 may include an indicator of a location (e.g., a zone ID, a cell ID, an identifier of a route) associated with the wireless device 1002. The network node 1006 may transmit a set of attributes 1010 to the wireless device 1002. The wireless device 1002 may receive the set of attributes 1010 from the network node 1006. In some aspects, the network node 1006 may transmit the set of attributes 1010 based on the request 1008. For example, the network node 1006 may select a subset of collected attributes based on the request 1008 (e.g., transmit attributes associated with a route indicated by the request 1008, transmit attributes associated with a zone indicated by the request 1008). In some aspects, the network node 1006 may periodically transmit the set of attributes 1010, for example by periodically transmitting an aggregated set of attributes from the set of wireless devices 1004 (e.g., every 5 minutes, every 10 minutes). In some aspects, the network node 1006 may act as a gateway to a data repository, for example an Internet gateway to a map aggregation server or a weather monitoring server. The request 1008 may include an indicator of a route of the wireless device 1002, and the set of attributes 1010 may include attributes from the data repository (e.g., road conditions, traffic conditions, weather conditions).

The network node 1006 may transmit the set of attributes 1010 as a sidelink transmission, for example a PSSCH transmission to a UE. The network node 1006 may transmit the set of attributes 1010 as a Uu transmission, for example a PDSCH transmission to a UE.

In some aspects, the wireless device 1002 may directly request a set of attributes from the set of wireless devices 1004, for example via sidelink transmissions. The wireless device 1002 may transmit a request 1012 to the set of wireless devices 1004. The set of wireless devices 1004 may receive the request 1012 from the wireless device 1002. The request 1012 may be a broadcast transmission (e.g., to all UEs that may receive the request 1012) or a unicast transmission (to specific UEs identified by a UE ID). The wireless device 1002 may transmit the request 1012 as a sidelink transmission, for example a PSSCH transmission to the set of wireless devices 1004.

The request 1012 may include an indicator of a location (e.g., a zone ID, a cell ID, an identifier of a route) associated with the wireless device 1002. The set of wireless devices 1004 may transmit a set of attributes 1014 to the wireless device 1002. The wireless device 1002 may receive the set of attributes 1014 from the set of wireless devices 1004. In some aspects, the set of wireless devices 1004 may transmit the set of attributes 1014 based on the request 1012. For example, the set of wireless devices 1004 may select a subset of collected attributes based on the request 1012 (e.g., transmit attributes associated with a route indicated by the request 1012, transmit attributes associated with a time period indicated by the request 1012, transmit attributes associated with a driving direction indicated by the request 1012). In some aspects, the set of wireless devices 1004 may periodically transmit the set of attributes 1014, for example by periodically transmitting the set of attributes 1014 (e.g., every 5 minutes, every 10 minutes). The set of wireless devices 1004 may transmit the set of attributes 1014 as a sidelink transmission, for example a PSSCH transmission to the wireless device 1002.

At 1016, the wireless device 1002 may calculate a predicted number of ODD switches along the route of the wireless device 1002 based on the set of attributes 1010, the set of attributes 1014, and/or attributes collected by the wireless device 1002 (e.g., collected by sensors of the wireless device 1002). For example, the wireless device 1002 may calculate that, during a portion of its route, the vehicle associated with the wireless device 1002 may have a predicted number of ODD switches that are greater or equal to a threshold value. The wireless device 1002 may query an ADS or an ADAS to determine what conditions may trigger an ODD switch, for example if the vehicle switches to a lane that is not a middle lane, or if the vehicle slows down to less than 10 mph, or if a threshold amount of precipitation or rain is detected. The ADS or the ADAS may indicate to the wireless device 1002 an indicator of an ODD threshold that influences an ODD state of the vehicle (e.g., an ODD state dependency of a physical divider along a route between the vehicle's lane and an oncoming traffic lane, an ODD state dependency of a minimum and a maximum speed threshold). The wireless device 1002 may calculate the predicted number of ODD switches based on one or more ODD thresholds received from the ADS/ADAS. The vehicle may switch an ODD mode based on one or more state dependencies, for example a speed of the vehicle (e.g., a maximum speed, a minimum speed), a vehicle lane position (e.g., a center lane position, a left lane position, a carpool lane position), a proximity to a road feature (e.g., more than 500 m from a traffic light, a physical divider between the vehicle and oncoming traffic), a weather attribute (e.g., less than a threshold amount of humidity, no fog on the route), and/or a road attribute (e.g., no pedestrian crossings along the route, no stop signs along the route, no traffic lights along the route). In some aspects, the wireless device 1002 may select the attributes to be used at 1016 based on a latency threshold. For example, the wireless device 1002 may use attributes that have a time stamp within 10 minutes or within 30 minutes of a current time.

At 1018, the wireless device 1002 may notify a driver, or may deactivate an autonomous driving system based on determining that the calculated predicted number of ODD switches is greater or equal than a threshold value. For example, the wireless device 1002 may display a visual notification via a touchscreen display associated with the driver that a large number of ODD switches is detected (e.g., "more than 10 ODD switches detected within the next 10 miles," "High number of ODD switches detected within the next 2 miles") In another example, the wireless device 1002 may play an audio notification via a speaker associated with the driver that the calculated predicted number of ODD switches is greater or equal than a threshold value. The driver may respond to the notification, for example by shutting off an ODD mode of the vehicle. In some aspects, the wireless device 1002 may provide a prompt based on the calculation, for example the wireless device 1002 may display a button on the touchscreen indicating that the ODD feature of the vehicle will be deactivated for 10 miles based on detecting that, within the next 10 miles, the vehicle will have a predicted number of ODD switches that exceed a threshold value. After the wireless device 1002 detects that the vehicle has exited the route area, the wireless device 1002 may reactivate the ODD feature of the vehicle. In some aspects, the wireless device 1002 may automatically deactivate the ODD feature of the vehicle in response to determining that the calculated predicted number of ODD switches is greater or equal than a threshold value.

The wireless device 1002 may transmit a set of attributes 1020 associated with the ODD condition of the wireless device 1002 to the network node 1006. The network node 1006 may receive the set of attributes 1020 associated with the ODD condition of the wireless device 1002. The set of attributes 1020 may include vehicle movement attributes, for example speed and locations of the wireless device 1002. The set of attributes 1020 may include ODD attributes, for example a number of ODD switches or a number of driver overrides over a period of time or during a portion of a route. Similarly, the wireless device 1002 may transmit a set of attributes 1022 associated with the ODD condition of the wireless device 1002 to the set of wireless devices 1004, allowing the set of wireless devices 1004 to calculate a predicted number of ODD switches based on the set of attributes 1022.

FIG. 11 is a flowchart 1100 of a method of wireless communication. The method may be performed by a UE (e.g., the UE 104, the UE 350 the UE 602, the UE 902; the wireless communication device 510, the wireless communication device 550; the wireless device 802, the wireless device 1002; the apparatus 1404). At 1102, the UE may obtain a set of attributes associated with a route of the UE. For example, 1102 may be performed by the wireless device 1002 in FIG. 10, which may receive the set of attributes 1010 from the network node 1006 associated with a route of the wireless device 1002. In another example, 1102 may be performed by the wireless device 1002 in FIG. 10, which may receive the set of attributes 1014 from the set of wireless devices 1004 associated with a route of the wireless device 1002. In another example, 1102 may be performed by the wireless device 1002 in FIG. 10, which may receive the set of attributes 1014 from a set of sensors (e.g., such as the set of sensors 904 in FIG. 9) associated with a route of the wireless device 1002. Moreover, 1102 may be performed by the component 198 in FIGS. 1, 3, and 14.

At 1104, the UE may calculate a predicted number of ODD switches along the route based on the set of attributes. For example, 1104 may be performed by the wireless device 1002 in FIG. 10, which may, at 1016, calculate a predicted number of ODD switches along the route based on the set of attributes 1010, the set of attributes 1014, and/or the set of attributes obtained from the sensors of the wireless device 1002. Moreover, 1104 may be performed by the component 198 in FIGS. 1, 3, and 14.

At 1106, the UE may notify a driver associated with the UE of an ODD condition based on the calculated predicted number of ODD switches being greater or equal than a threshold value. For example, 1106 may be performed by the wireless device 1002 in FIG. 10, which may, at 1018 notify a driver (e.g., via a display, a touchscreen, a speaker) associated with the wireless device 1002 of an ODD condition based on the calculated predicted number of ODD switches being greater or equal than a threshold value. Moreover, 1106 may be performed by the component 198 in FIGS. 1, 3, and 14.

At 1108, the UE may deactivate an ODD mode associated with the UE based on the calculated predicted number of ODD switches being greater or equal than a threshold value. For example, 1108 may be performed by the wireless device 1002 in FIG. 10, which may, at 1018, deactivate an ODD mode (i.e., deactivate the ODD feature of a vehicle for a period of time or during a portion of a route) associated with the wireless device 1002 based on the calculated predicted number of ODD switches being greater or equal than a threshold value. Moreover, 1108 may be performed by the component 198 in FIGS. 1, 3, and 14.

FIG. 12 is a flowchart 1200 of a method of wireless communication. The method may be performed by a UE (e.g., the UE 104, the UE 350 the UE 602, the UE 902; the wireless communication device 510, the wireless communication device 550; the wireless device 802, the wireless device 1002; the apparatus 1404). At 1202, the UE may obtain a set of attributes associated with a route of the UE. For example, 1202 may be performed by the wireless device 1002 in FIG. 10, which may receive the set of attributes 1010 from the network node 1006 associated with a route of the wireless device 1002. In another example, 1202 may be performed by the wireless device 1002 in FIG. 10, which may receive the set of attributes 1014 from the set of wireless devices 1004 associated with a route of the wireless device 1002. In another example, 1202 may be performed by the wireless device 1002 in FIG. 10, which may receive the set of attributes 1014 from a set of sensors (e.g., such as the set of sensors 904 in FIG. 9) associated with a route of the wireless device 1002. Moreover, 1202 may be performed by the component 198 in FIGS. 1, 3, and 14.

At 1204, the UE may calculate a predicted number of ODD switches along the route based on the set of attributes. For example, 1204 may be performed by the wireless device 1002 in FIG. 10, which may, at 1016, calculate a predicted number of ODD switches along the route based on the set of attributes 1010, the set of attributes 1014, and/or the set of attributes obtained from the sensors of the wireless device 1002. Moreover, 1204 may be performed by the component 198 in FIGS. 1, 3, and 14.

At 1206, the UE may notify a driver associated with the UE of an ODD condition based on the calculated predicted number of ODD switches being greater or equal than a threshold value. For example, 1206 may be performed by the wireless device 1002 in FIG. 10, which may, at 1018 notify a driver (e.g., via a display, a touchscreen, a speaker) associated with the wireless device 1002 of an ODD condition based on the calculated predicted number of ODD switches being greater or equal than a threshold value. Moreover, 1206 may be performed by the component 198 in FIGS. 1, 3, and 14.

At 1208, the UE may deactivate an ODD mode associated with the UE based on the calculated predicted number of ODD switches being greater or equal than a threshold value. For example, 1208 may be performed by the wireless device 1002 in FIG. 10, which may, at 1018, deactivate an ODD mode (i.e., deactivate the ODD feature of a vehicle for a period of time or during a portion of a route) associated with the wireless device 1002 based on the calculated predicted number of ODD switches being greater or equal than a threshold value. Moreover, 1208 may be performed by the component 198 in FIGS. 1, 3, and 14.

At 1210, the UE may obtain a set of attributes associated with a route of the UE by receiving a navigation map from a map aggregation server. For example, 1210 may be performed by the wireless device 1002 in FIG. 10, which may receive a navigation map as the set of attributes 1010 from a map aggregation server via the network node 1006. Moreover, 1210 may be performed by the component 198 in FIGS. 1, 3, and 14.

At 1212, the UE may obtain a set of attributes associated with a route of the UE by receiving a weather report map from a weather monitoring server. For example, 1212 may be performed by the wireless device 1002 in FIG. 10, which may receive a weather report map as the set of attributes 1010 from a weather monitoring server via the network node 1006. Moreover, 1212 may be performed by the component 198 in FIGS. 1, 3, and 14.

At 1214, the UE may obtain a set of attributes associated with a route of the UE by receiving a set of vehicle movement attributes from a second wireless device. For example, 1214 may be performed by the wireless device 1002 in FIG. 10, which may receive a set of vehicle movement attributes as the set of attributes 1014 from at least one of the set of wireless devices 1004. Moreover, 1214 may be performed by the component 198 in FIGS. 1, 3, and 14.

At 1216, the UE may obtain a set of attributes associated with a route of the UE by receiving a sidelink message including a subset of the set of attributes. For example, 1216 may be performed by the wireless device 1002 in FIG. 10, which may receive a sidelink message including the set of attributes 1014. The set of attributes 1014 may be a subset of the set of attributes that the wireless device 1002 collects and uses at 1016. Moreover, 1216 may be performed by the component 198 in FIGS. 1, 3, and 14.

At 1218, the UE may obtain a set of attributes associated with a route of the UE by obtaining a subset of the set of attributes from a set of sensors associated with the ODD state dependency. For example, 1218 may be performed by the wireless device 1002 in FIG. 10, which may obtain a subset of the set of attributes from a set of sensors (e.g., similar to the 904/in FIG. 9) associated with the ODD state dependency. Moreover, 1218 may be performed by the component 198 in FIGS. 1, 3, and 14.

At 1220, the UE may transmit the subset of the set of attributes. For example, 1220 may be performed by the wireless device 1002 in FIG. 10, which may transmit the set of attributes 1020 to the network node 1006. The set of attributes 1020 may be a subset of the set of attributes that the wireless device 1002 collects. In another example, the wireless device 1002 may transmit the set of attributes 1022 to the set of wireless devices 1004. The set of attributes 1022 may be a subset of the set of attributes that the wireless device 1002 collects. Moreover, 1220 may be performed by the component 198 in FIGS. 1, 3, and 14.

FIG. 13 is a flowchart 1300 of a method of wireless communication. The method may be performed by a UE (e.g., the UE 104, the UE 350 the UE 602, the UE 902; the wireless communication device 510, the wireless communication device 550; the wireless device 802, the wireless device 1002; the apparatus 1404). At 1302, the UE may obtain a set of attributes associated with a route of the UE. For example, 1302 may be performed by the wireless device 1002 in FIG. 10, which may receive the set of attributes 1010 from the network node 1006 associated with a route of the wireless device 1002. In another example, 1302 may be performed by the wireless device 1002 in FIG. 10, which may receive the set of attributes 1014 from the set of wireless devices 1004 associated with a route of the wireless device 1002. In another example, 1302 may be performed by the wireless device 1002 in FIG. 10, which may receive the set of attributes 1014 from a set of sensors (e.g., such as the set of sensors 904 in FIG. 9) associated with a route of the wireless device 1002. Moreover, 1302 may be performed by the component 198 in FIGS. 1, 3, and 14.

At 1304, the UE may calculate a predicted number of ODD switches along the route based on the set of attributes. For example, 1304 may be performed by the wireless device 1002 in FIG. 10, which may, at 1016, calculate a predicted number of ODD switches along the route based on the set of attributes 1010, the set of attributes 1014, and/or the set of attributes obtained from the sensors of the wireless device 1002. Moreover, 1304 may be performed by the component 198 in FIGS. 1, 3, and 14.

At 1306, the UE may notify a driver associated with the UE of an ODD condition based on the calculated predicted number of ODD switches being greater or equal than a threshold value. For example, 1306 may be performed by the wireless device 1002 in FIG. 10, which may, at 1018 notify a driver (e.g., via a display, a touchscreen, a speaker) associated with the wireless device 1002 of an ODD condition based on the calculated predicted number of ODD switches being greater or equal than a threshold value. Moreover, 1306 may be performed by the component 198 in FIGS. 1, 3, and 14.

At 1308, the UE may deactivate an ODD mode associated with the UE based on the calculated predicted number of ODD switches being greater or equal than a threshold value. For example, 1308 may be performed by the wireless device 1002 in FIG. 10, which may, at 1018, deactivate an ODD mode (i.e., deactivate the ODD feature of a vehicle for a period of time or during a portion of a route) associated with the wireless device 1002 based on the calculated predicted number of ODD switches being greater or equal than a threshold value. Moreover, 1308 may be performed by the component 198 in FIGS. 1, 3, and 14.

At 1310, the UE may receive a command to deactivate the ODD mode of the UE from the driver after the notification of the ODD condition. For example, 1310 may be performed by the wireless device 1002 in FIG. 10, which may receive a command to deactivate the ODD mode of the wireless device 1002 (e.g., via a touchscreen, via a microphone command, via a button on a dashboard of the vehicle) from the driver after the notification of the ODD condition at 1018. Moreover, 1310 may be performed by the component 198 in FIGS. 1, 3, and 14.

At 1314, the UE may deactivate the ODD mode of the UE. For example, 1314 may be performed by the wireless device 1002 in FIG. 10, which may deactivate the ODD mode of the wireless device 1002 in response to receiving the command from the driver. Moreover, 1314 may be performed by the component 198 in FIGS. 1, 3, and 14.

At 1316, the UE may query at least one of an AD system or an ADAS associated with an ODD state dependency. For example, 1316 may be performed by the wireless device 1002 in FIG. 10, which may query at least one of an ADS or an ADAS associated with an ODD state dependency of the vehicle associated with the wireless device 1002. Moreover, 1316 may be performed by the component 198 in FIGS. 1, 3, and 14.

At 1318, the UE may receive an indicator of an ODD threshold from at least one of the AD system or the ADAS system. For example, 1318 may be performed by the wireless device 1002 in FIG. 10, which may receive an indicator of an ODD threshold (e.g., a minimum speed, a maximum speed) from at least one of the ADS or the ADAS system. Moreover, 1318 may be performed by the component 198 in FIGS. 1, 3, and 14.

At 1320, the UE may calculate a predicted number of ODD switches along the route based on the set of attributes by calculating the predicted number of ODD switches further based on the ODD threshold. For example, 1320 may be performed by the wireless device 1002 in FIG. 10, which may, at 1018, calculate the predicted number of ODD switches further based on the ODD threshold. Moreover, 1320 may be performed by the component 198 in FIGS. 1, 3, and 14.

At 1322, the UE may select a subset of the set of attributes based on a latency threshold. For example, 1322 may be performed by the wireless device 1002 in FIG. 10, which may select a subset of the set of attributes collected by the wireless device 1002 based on a latency threshold (e.g., attributes associated with time-stamps within the last 30 minutes). Moreover, 1322 may be performed by the component 198 in FIGS. 1, 3, and 14.

At 1324, the UE may calculate a predicted number of ODD switches along the route based on the set of attributes by calculating the predicted number of ODD switches further based on the subset of the set of attributes. For example, 1324 may be performed by the wireless device 1002 in FIG. 10, which may, at 1018 calculate the predicted number of ODD switches further based on the subset of the set of attributes threshold (e.g., attributes associated with time-stamps within the last 30 minutes). Moreover, 1324 may be performed by the component 198 in FIGS. 1, 3, and 14.

At 1326, the UE may notify a driver associated with the UE of an ODD condition based on the calculated predicted number of ODD switches being greater or equal than a threshold value by displaying a visual notification via a touchscreen display associated with the driver. For example, 1326 may be performed by the wireless device 1002 in FIG. 10, which may, at 1018, display a visual notification via a touchscreen display associated with the driver. Moreover, 1326 may be performed by the component 198 in FIGS. 1, 3, and 14.

At 1328, the UE may notify a driver associated with the UE of an ODD condition based on the calculated predicted number of ODD switches being greater or equal than a threshold value by playing an audio notification via a speaker associated with the driver. For example, 1328 may be performed by the wireless device 1002 in FIG. 10, which may, at 1018, play an audio notification via a speaker associated with the driver. Moreover, 1328 may be performed by the component 198 in FIGS. 1, 3, and 14.

Figure 14:
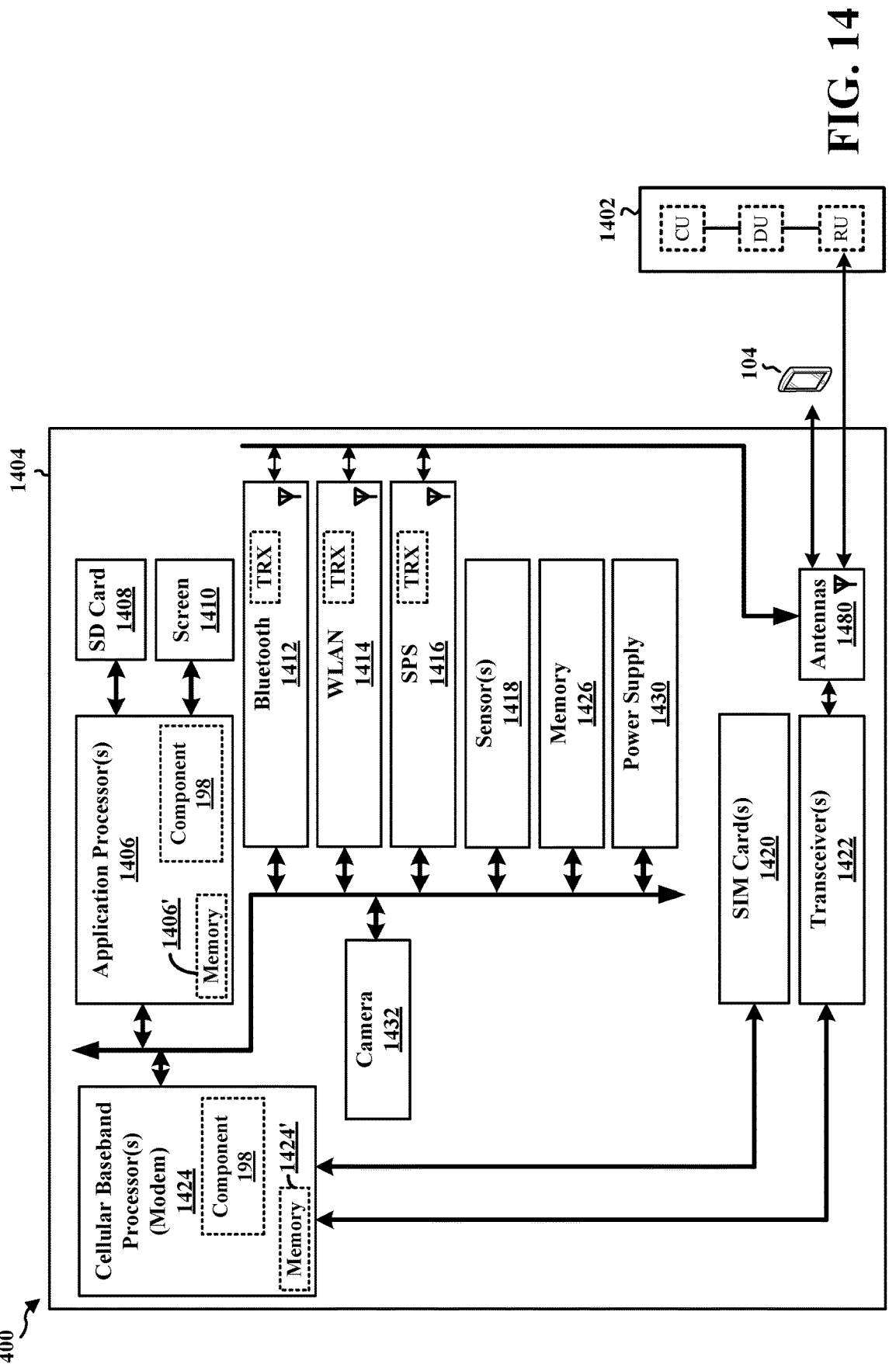
FIG. 14 is a diagram illustrating an example of a hardware implementation for an example apparatus and/or network entity.

FIG. 14 is a diagram 1400 illustrating an example of a hardware implementation for an apparatus 1404. The apparatus 1404 may be a UE, a component of a UE, or may implement UE functionality. In some aspects, the apparatus 1404 may include at least one cellular baseband processor 1424 (also referred to as a modem) coupled to one or more transceivers 1422 (e.g., cellular RF transceiver). The cellular baseband processor(s) 1424 may include at least one on-chip memory 1424'. In some aspects, the apparatus 1404 may further include one or more subscriber identity modules (SIM) cards 1420 and at least one application processor 1406 coupled to a secure digital (SD) card 1408 and a screen 1410. The application processor(s) 1406 may include on-chip memory 1406'. In some aspects, the apparatus 1404 may further include a Bluetooth module 1412, a WLAN module 1414, an SPS module 1416 (e.g., GNSS module), one or more sensor modules 1418 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1426, a power supply 1430, and/or a camera 1432. The Bluetooth module 1412, the WLAN module 1414, and the SPS module 1416 may include an on-chip transceiver (TRX) (or in some cases, just a receiver (RX)). The Bluetooth module 1412, the WLAN module 1414, and the SPS module 1416 may include their own dedicated antennas and/or utilize the antennas 1480 for communication. The cellular baseband processor(s) 1424 communicates through the transceiver(s) 1422 via one or more antennas 1480 with the UE 104 and/or with an RU associated with a network entity 1402. The cellular baseband processor(s) 1424 and the application processor(s) 1406 may each include a computer-readable medium/memory 1424', 1406', respectively. The additional memory modules 1426 may also be considered a computer-readable medium/memory. Each computer-readable medium/memory 1424', 1406', 1426 may be non-transitory. The cellular baseband processor(s) 1424 and the application processor(s) 1406 are each responsible for general processing, including the execution of software stored on the computer-readable medium/memory. The software, when executed by the cellular baseband processor(s) 1424/application processor(s) 1406, causes the cellular baseband processor(s) 1424/application processor(s) 1406 to perform the various functions described supra. The cellular baseband processor(s) 1424 and the application processor(s) 1406 are configured to perform the various functions described supra based at least in part of the information stored in the memory. That is, the cellular baseband processor(s) 1424 and the application processor(s) 1406 may be configured to perform a first subset of the various functions described supra without information stored in the memory and may be configured to perform a second subset of the various functions described supra based on the information stored in the memory. The computer-readable medium/memory may also be used for storing data that is manipulated by the cellular baseband processor(s) 1424/application processor(s) 1406 when executing software. The cellular baseband processor(s) 1424/application processor(s) 1406 may be a component of the UE 350 and may include the at least one memory 360 and/or at least one of the TX processor 368, the RX processor 356, and the controller/processor 359. In one configuration, the apparatus 1404 may be at least one processor chip (modem and/or application) and include just the cellular baseband processor(s) 1424 and/or the application processor(s) 1406, and in another configuration, the apparatus 1404 may be the entire UE (e.g., see UE 350 of FIG. 3) and include the additional modules of the apparatus 1404.

As discussed supra, the component 198 may be configured to receive a set of attributes associated with a route of the UE. The component 198 may be within the cellular baseband processor(s) 1424, the application processor(s) 1406, or both the cellular baseband processor(s) 1424 and the application processor(s) 1406. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 1404 may include a variety of components configured for various functions. In one configuration, the apparatus 1404, and in particular the cellular baseband processor(s) 1424 and/or the application processor(s) 1406, may include means for obtaining a set of attributes associated with a route of the apparatus 1404. The apparatus 1404 may include means for calculating a predicted number of ODD switches along the route based on the set of attributes. The apparatus 1404 may include means for calculating a predicted number of ODD switches along the route based on the set of attributes. The apparatus 1404 may include means for notifying a driver associated with the apparatus 1404 of an ODD condition based on the calculated predicted number of ODD switches being greater or equal than a threshold value (e.g., notifying the driver that apparatus 1404 may switch an ODD at least a threshold number of times within a threshold distance). The apparatus 1404 may include means for deactivating an ODD mode associated with the apparatus 1404 based on the calculated predicted number of ODD switches being greater or equal than a threshold value. The apparatus 1404 may include means for obtaining the set of attributes by receiving a navigation map from a map aggregation server. The apparatus 1404 may include means for obtaining the set of attributes by receiving a weather report map from a weather monitoring server. The apparatus 1404 may include means for obtaining the set of attributes by receiving a set of vehicle movement attributes from a second wireless device. The second wireless device may include at least one of a second UE or an RSU. The apparatus 1404 may include means for obtaining the set of attributes by receiving a sidelink message including the set of attributes. The set of attributes may include at least of (a) a speed metric associated with a portion of the route, (b) an ODD switching metric associated with the portion of the route, (c) a driver override metric associated with the portion of the route, (d) a weather metric associated with the portion of the route, and/or (e) a road attribute associated with the portion of the route; or a road feature associated with the portion of the route. The apparatus 1404 may include means for calculating the predicted number of ODD switches by querying at least one of an AD system or an ADAS associated with an ODD state dependency, by receiving an indicator of an ODD threshold from at least one of the AD system or the ADAS system, and by calculating the predicted number of ODD switches further based on the ODD threshold. The ODD state dependency may include at least one of: (a) a vehicle speed, (b) a vehicle lane position, (c) a proximity to a road feature, (d) a weather attribute, and/or (e) a road attribute. The apparatus 1404 may include means for obtaining a subset of the set of attributes from a set of sensors associated with the ODD state dependency. The apparatus 1404 may include means for transmitting the second set of attributes. The apparatus 1404 may include means for calculating the predicted number of ODD switches by selecting a subset of the set of attributes based on a latency threshold, and by calculating the predicted number of ODD switches further based on the subset of the set of attributes. The apparatus 1404 may include means for notifying the driver of the ODD condition by displaying a visual notification via a touchscreen display associated with the driver. The apparatus 1404 may include means for notifying the driver of the ODD condition by playing an audio notification via a speaker associated with the driver. The apparatus 1404 may include means for receiving a command to deactivate the ODD mode of the apparatus 1404 from the driver after the notification of the ODD condition. The apparatus 1404 may include means for deactivating the ODD mode of the apparatus 1404 after the reception of the command. The apparatus 1404 may include a vehicle. The apparatus 1404 may include a wireless device communicatively coupled to a vehicle. The means may be the component 198 of the apparatus 1404 configured to perform the functions recited by the means. As described supra, the apparatus 1404 may include the TX processor 368, the RX processor 356, and the controller/processor 359. As such, in one configuration, the means may be the TX processor 368, the RX processor 356, and/or the controller/processor 359 configured to perform the functions recited by the means.

Figure 15:
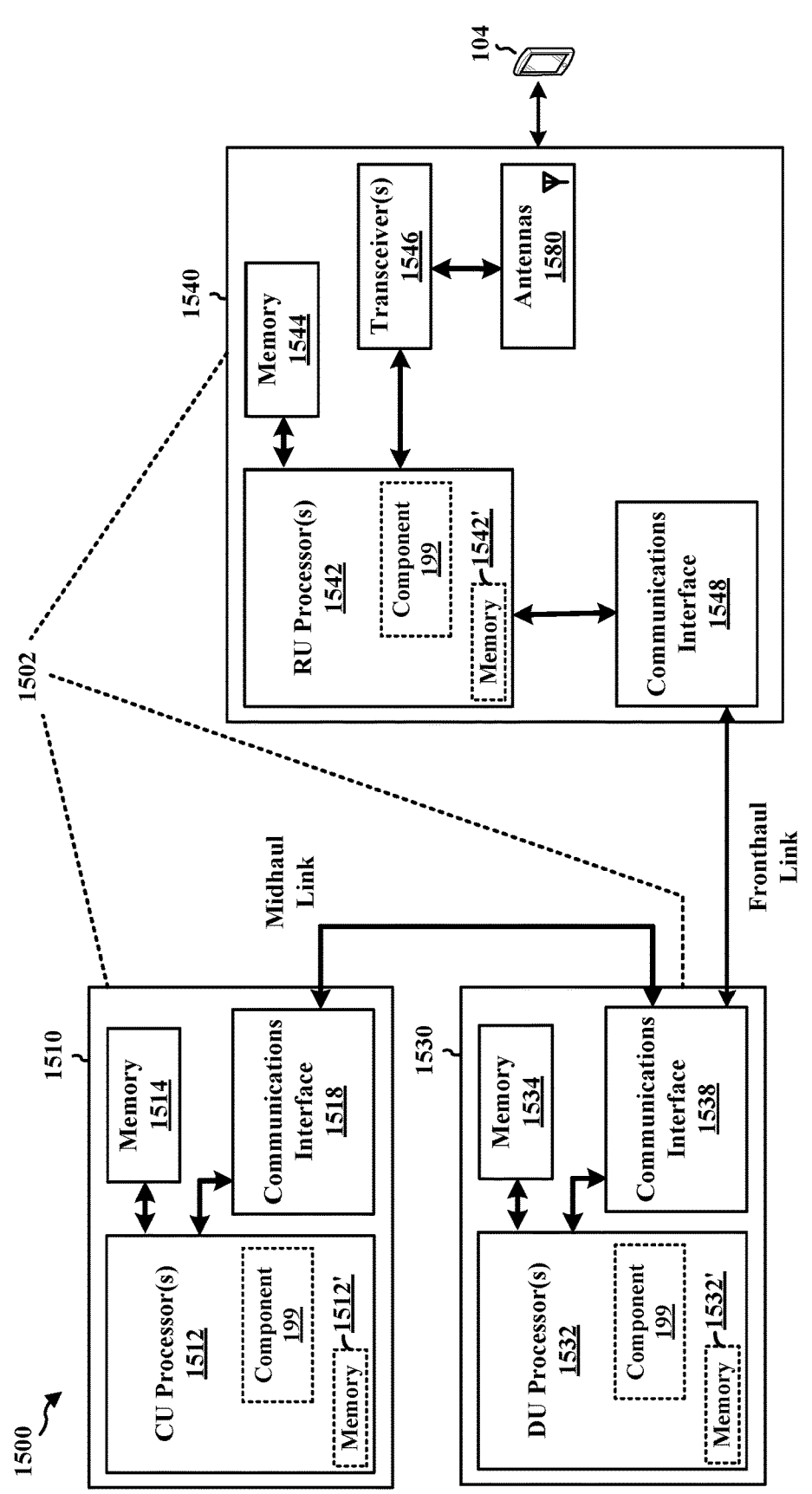
FIG. 15 is a diagram illustrating an example of a hardware implementation for an example network entity.

FIG. 15 is a diagram 1500 illustrating an example of a hardware implementation for a network entity 1502. The network entity 1502 may be a BS, a component of a BS, or may implement BS functionality. The network entity 1502 may include at least one of a CU 1510, a DU 1530, or an RU 1540. For example, depending on the layer functionality handled by the component 199, the network entity 1502 may include the CU 1510; both the CU 1510 and the DU 1530; each of the CU 1510, the DU 1530, and the RU 1540; the DU 1530; both the DU 1530 and the RU 1540; or the RU 1540. The CU 1510 may include at least one CU processor 1512. The CU processor(s) 1512 may include on-chip memory 1512'. In some aspects, the CU 1510 may further include additional memory modules 1514 and a communications interface 1518. The CU 1510 communicates with the DU 1530 through a midhaul link, such as an F1 interface. The DU 1530 may include at least one DU processor 1532. The DU processor(s) 1532 may include on-chip memory 1532'. In some aspects, the DU 1530 may further include additional memory modules 1534 and a communications interface 1538. The DU 1530 communicates with the RU 1540 through a fronthaul link. The RU 1540 may include at least one RU processor 1542. The RU processor(s) 1542 may include on-chip memory 1542'. In some aspects, the RU 1540 may further include additional memory modules 1544, one or more transceivers 1546, antennas 1580, and a communications interface 1548. The RU 1540 communicates with the UE 104. The on-chip memory 1512', 1532', 1542' and the additional memory modules 1514, 1534, 1544 may each be considered a computer-readable medium/memory. Each computer-readable medium/memory may be non-transitory. Each of the processors 1512, 1532, 1542 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 may be configured to receive a set of attributes associated with a route of the UE. The component 199 may be configured to transmit the set of attributes associated with the route of the UE. In other words, the component 199 may be configured to aggregate attributes from one or more UEs to transmit to a UE for use in calculating an ODD condition associated with a vehicle of the UE. The component 199 may be within one or more processors of one or more of the CU 1510, DU 1530, and the RU 1540. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 1502 may include a variety of components configured for various functions. In one configuration, the network entity 1502 may include means for receiving a set of attributes associated with a route of the UE. The network entity 1502 may include means for transmitting the set of attributes associated with the route of the UE. The means may be the component 199 of the network entity 1502 configured to perform the functions recited by the means. As described supra, the network entity 1502 may include the TX processor 316, the RX processor 370, and the controller/processor 375. As such, in one configuration, the means may be the TX processor 316, the RX processor 370, and/or the controller/processor 375 configured to perform the functions recited by the means.

Figure 16:
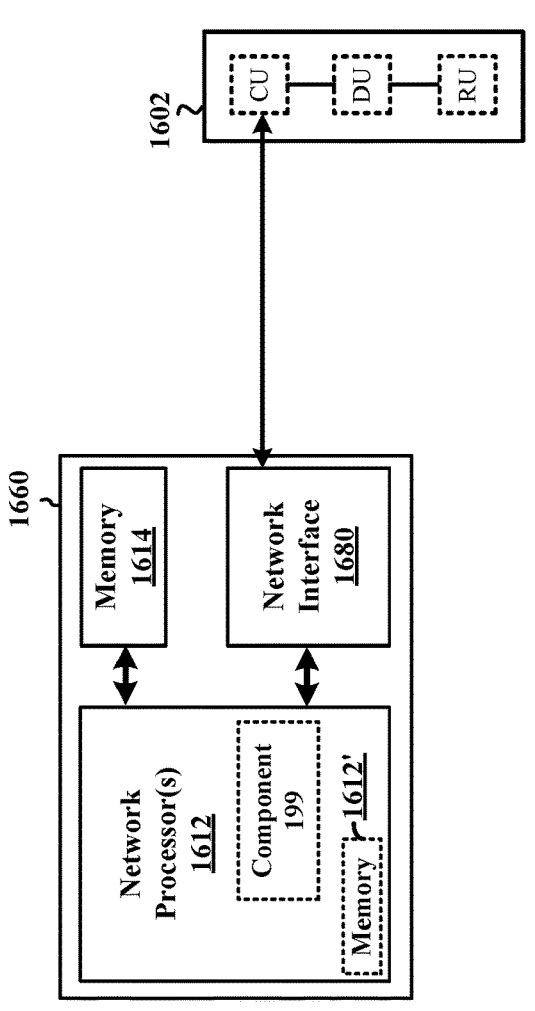
FIG. 16 is a diagram illustrating an example of a hardware implementation for an example network entity.

FIG. 16 is a diagram 1600 illustrating an example of a hardware implementation for a network entity 1660. In one example, the network entity 1660 may be within the core network 120. The network entity 1660 may include at least one network processor 1612. The network processor(s) 1612 may include on-chip memory 1612'. In some aspects, the network entity 1660 may further include additional memory modules 1614. The network entity 1660 communicates via the network interface 1680 directly (e.g., backhaul link) or indirectly (e.g., through a RIC) with the CU 1602. The on-chip memory 1612' and the additional memory modules 1614 may each be considered a computer-readable medium/memory. Each computer-readable medium/memory may be non-transitory. The network processor(s) 1612 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 may be configured to receive a set of attributes associated with a route of the UE. The component 199 may be configured to transmit the set of attributes associated with the route of the UE. In other words, the component 199 may be configured to aggregate attributes from one or more UEs to transmit to a UE for use in calculating an ODD condition associated with a vehicle of the UE. The component 199 may be within the network processor(s) 1612. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. The network entity 1660 may include a variety of components configured for various functions. In one configuration, the network entity 1660 may include means for receiving a set of attributes associated with a route of the UE. The network entity 1660 may include means for transmitting the set of attributes associated with the route of the UE. The means may be the component 199 of the network entity 1660 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, may send the data to a device that transmits the data, or may send the data to a component of the device. A device configured to "obtain" data, such as a transmission, signal, or message, may receive, for example with a transceiver, may obtain the data from a device that receives the data, or may obtain the data from a component of the device. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a user equipment (UE), comprising: obtaining a set of attributes associated with a route of the UE; calculating a predicted number of operational design domain (ODD) switches along the route based on the set of attributes; and notifying a driver associated with the UE of an ODD condition or deactivating an ODD mode associated with the UE based on the calculated predicted number of ODD switches being greater or equal than a threshold value.

Aspect 2 is the method of aspect 1, wherein obtaining the set of attributes comprises at least one of: receiving a navigation map from a map aggregation server; receiving a weather report map from a weather monitoring server; or receiving a set of vehicle movement attributes from a second wireless device.

Aspect 3 is the method of aspect 2, wherein the second wireless device comprises at least one of a second UE or a roadside unit (RSU).

Aspect 4 is the method of any of aspects 1 to 3, wherein obtaining the set of attributes comprises receiving a sidelink message comprising a subset of the set of attributes.

Aspect 5 is the method of any of aspects 1 to 4, wherein the set of attributes comprise at least of: a speed metric associated with a portion of the route; an ODD switching metric associated with the portion of the route; a driver override metric associated with the portion of the route; a weather metric associated with the portion of the route; a road attribute associated with the portion of the route; or a road feature associated with the portion of the route.

Aspect 6 is the method of any of aspects 1 to 5, wherein calculating the predicted number of ODD switches comprises: querying at least one of an autonomous driving (AD) system or an advanced driver assistance system (ADAS) associated with an ODD state dependency; receiving an indicator of an ODD threshold from at least one of the AD system or the ADAS system; and calculating the predicted number of ODD switches further based on the ODD threshold.

Aspect 7 is the method of aspect 6, wherein the ODD state dependency comprises at least one of: a vehicle speed; a vehicle lane position; a proximity to a road feature; a weather attribute; or a road attribute.

Aspect 8 is the method of either of aspects 6 or 7, wherein obtaining the set of attributes comprises receiving a subset of the set of attributes from a set of sensors associated with the ODD state dependency. The method may also comprises transmitting the subset of the set of attributes.

Aspect 9 is the method of any of aspects 1 to 8, wherein calculating the predicted number of ODD switches comprises: selecting a subset of the set of attributes based on a latency threshold; and calculating the predicted number of ODD switches further based on the subset of the set of attributes.

Aspect 10 is the method of any of aspects 1 to 9, wherein notifying the driver of the ODD condition comprises at least one of: displaying a visual notification via a touchscreen display associated with the driver; or playing an audio notification via a speaker associated with the driver.

Aspect 11 is the method of any of aspects 1 to 10, further comprising: receiving a command to deactivate the ODD mode of the UE from the driver after the notification of the ODD condition; and deactivating the ODD mode of the UE after the reception of the command.

Aspect 12 is the method of any of aspects 1 to 11, wherein the UE comprises at least one of a vehicle or a wireless device communicatively coupled to the vehicle.

Aspect 13 is the method of aspect 8, further comprising transmitting the second set of attributes.

Aspect 14 is the method of any of aspects 1 to 13, wherein notifying the driver associated with the UE of the ODD condition comprises: outputting, for the driver associated with the UE, an indication of the ODD condition.

Aspect 15 is the method of aspect 14, wherein outputting, for the driver associated with the UE, the indication of the ODD condition comprises: transmitting, for the driver associated with the UE, the indication of the ODD condition.

Aspect 16 is an apparatus for wireless communication, comprising: at least one memory; and at least one processor coupled to the at least one memory and, based at least in part on information stored in the at least one memory, the at least one processor, individually or in any combination, is configured to perform the method of any of aspects 1 to 15.

Aspect 17 is an apparatus for wireless communication, comprising means for performing each step in the method of any of aspects 1 to 15.

Aspect 18 is the apparatus of any of aspects 1 to 15, further comprising a transceiver (e.g., a transceiver coupled to the at least one processor in Aspect 16) configured to receive or to transmit in association with the method of any of aspects 1 to 15.

Aspect 19 is a computer-readable medium (e.g., a non-transitory computer-readable medium) storing computer executable code, the code when executed by at least one processor causes the at least one processor to perform the method of any of aspects 1 to 15.

What is claimed is:

1. An apparatus for wireless communication at a user equipment (UE), comprising:
   at least one memory; and
   at least one processor coupled to the at least one memory and, based at least in part on information stored in the at least one memory, the at least one processor is configured to:
   obtain a set of attributes associated with a route of the UE;
   calculate a predicted number of operational design domain (ODD) switches along the route based on the set of attributes, wherein the ODD switches comprise switches from an on mode of an autonomous driving (AD) system or an advanced driver assistance system (ADAS) to an off mode of the AD system or the ADAS or from the off mode to the on mode;
   notify a driver of a vehicle associated with the UE of an ODD condition associated with the calculated predicted number of ODD switches being greater than or equal to a threshold value;
   receive a command to deactivate the AD system or the ADAS from the driver after a notification of the ODD condition; and
   switch the AD system or the ADAS to the off mode after reception of the command.

2. The apparatus of claim 1, wherein, to obtain the set of attributes, the at least one processor is configured to:
   receive a navigation map from a map aggregation server;
   receive a weather report map from a weather monitoring server; or
   receive a set of vehicle movement attributes from a second wireless device.

3. The apparatus of claim 2, wherein the second wireless device comprises at least one of a second UE or a roadside unit (RSU).

4. The apparatus of claim 1, wherein, to obtain the set of attributes, the at least one processor is configured to:
   receive a sidelink message comprising a subset of the set of attributes.

5. The apparatus of claim 1, wherein the set of attributes comprises at least one of:
   a speed metric associated with a portion of the route;
   an ODD switching metric associated with the portion of the route;
   a driver override metric associated with the portion of the route;
   a weather metric associated with the portion of the route;
   a road attribute associated with the portion of the route; or
   a road feature associated with the portion of the route.

6. The apparatus of claim 1, wherein, to calculate the predicted number of ODD switches, the at least one processor is configured to:
   query the AD system or the ADAS;
   receive an indicator of an ODD threshold associated with an ODD state dependency from the AD system or the ADAS; and
   calculate the predicted number of ODD switches further based on the ODD threshold.

7. The apparatus of claim 6, wherein the ODD state dependency comprises at least one of:
   a vehicle speed;
   a vehicle lane position;
   a proximity to a road feature;
   a weather attribute; or
   a road attribute.

8. The apparatus of claim 6, to obtain the set of attributes, the at least one processor is configured to:
   obtain a subset of the set of attributes from a set of sensors associated with the ODD state dependency.

9. The apparatus of claim 8, wherein the at least one processor is further configured to:
   transmit the subset of the set of attributes.

10. The apparatus of claim 1, wherein, to calculate the predicted number of ODD switches, the at least one processor is configured to:
   select a subset of the set of attributes based on a latency threshold and a current time; and
   calculate the predicted number of ODD switches further based on the subset of the set of attributes.

11. The apparatus of claim 1, wherein the at least one processor is further configured to:
   display a visual notification via a touchscreen display to the driver of the vehicle associated with the UE; or
   play an audio notification via a speaker to the driver.

12. The apparatus of claim 1, wherein the UE comprises at least one of the vehicle or a wireless device communicatively coupled to the vehicle.

13. The apparatus of claim 1, further comprising a transceiver coupled to the at least one processor, wherein, to receive the set of attributes associated with the route of the UE, the at least one processor is configured to:
   receive, via the transceiver, the set of attributes associated with the route of the UE.

14. The apparatus of claim 1, wherein, to switch the AD system or the ADAS to the off mode, the at least one processor is configured to:
   automatically switch the AD system or the ADAS to the off mode.

15. A method of wireless communication at a user equipment (UE), comprising:
   obtaining a set of attributes associated with a route of the UE;
   calculating a predicted number of operational design domain (ODD) switches along the route based on the set of attributes, wherein the ODD switches comprise switches from an on mode of an autonomous driving

43

44

(AD) system or an advanced driver assistance system (ADAS) to an off mode of the AD system or the ADAS or from the off mode to the on mode; and notifying a driver of a vehicle associated with the UE of an ODD condition associated with the calculated predicted number of ODD switches being greater than or equal to a threshold value;

receiving a command to deactivate the AD system or the ADAS from the driver after a notification of the ODD condition; and switching the AD system or the ADAS to the off mode after reception of the command.

16. The method of claim 15, wherein obtaining the set of attributes comprises at least one of:

receiving a navigation map from a map aggregation server;

receiving a weather report map from a weather monitoring server; or receiving a set of vehicle movement attributes from a second wireless device.

17. The method of claim 16, wherein the second wireless device comprises at least one of a second UE or a roadside unit (RSU).

18. The method of claim 15, wherein obtaining the set of attributes comprises:

receiving a sidelink message comprising the set of attributes.

19. The method of claim 15, wherein the set of attributes comprises at least one of:

a speed metric associated with a portion of the route;

an ODD switching metric associated with the portion of the route;

a driver override metric associated with the portion of the route;

a weather metric associated with the portion of the route;

a road attribute associated with the portion of the route; or a road feature associated with the portion of the route.

20. The method of claim 15, wherein calculating the predicted number of ODD switches comprises:

querying the AD system or the ADAS;

receiving an indicator of an ODD threshold associated with an ODD state dependency from the AD system or the ADAS; and calculating the predicted number of ODD switches further based on the ODD threshold.

21. The method of claim 20, wherein the ODD state dependency comprises at least one of:

a vehicle speed;

a vehicle lane position;

a proximity to a road feature;

a weather attribute; or a road attribute.

22. The method of claim 20, wherein obtaining the set of attributes comprises:

receiving a subset of the set of attributes from a set of sensors associated with the ODD state dependency.

23. The method of claim 22, further comprising:

transmitting the subset of the set of attributes.

24. The method of claim 15, wherein calculating the predicted number of ODD switches comprises:

selecting a subset of the set of attributes based on a latency threshold; and calculating the predicted number of ODD switches further based on the subset of the set of attributes.

25. The method of claim 15, further comprising:

displaying a visual notification via a touchscreen display to the driver of the vehicle associated with the UE; or playing an audio notification via a speaker to the driver.

26. The method of claim 15, wherein switching the AD system or the ADAS to the off mode comprises:

automatically switching the AD system or the ADAS to the off mode.

27. An apparatus for wireless communication at a user equipment (UE), comprising:

a transceiver;

means for obtaining, via the transceiver, a set of attributes associated with a route of the UE;

means for calculating a predicted number of operational design domain (ODD) switches along the route based on the set of attributes, wherein the ODD switches comprise switches from an on mode of an autonomous driving (AD) system or an advanced driver assistance system (ADAS) to an off mode of the AD system or the ADAS or from the off mode to the on mode;

means for notifying a driver of a vehicle associated with the UE of an ODD condition associated with the calculated predicted number of ODD switches being greater than or equal to a threshold value;

means for receiving a command to deactivate the AD system or the ADAS from the driver after a notification of the ODD condition; and means for switching the AD system or the ADAS to the off mode after reception of the command.

28. A non-transitory computer-readable medium storing computer executable code at a user equipment (UE), the code when executed by at least one processor causes the at least one processor to:

obtain a set of attributes associated with a route of the UE;

calculate a predicted number of operational design domain (ODD) switches along the route based on the set of attributes, wherein the ODD switches comprise switches from an on mode of an autonomous driving (AD) system or an advanced driver assistance system (ADAS) to an off mode of the AD system or the ADAS or from the off mode to the on mode; and notify a driver of a vehicle associated with the UE of an ODD condition associated with the calculated predicted number of ODD switches being greater than or equal to a threshold value;

receive a command to deactivate the AD system or the ADAS from the driver after a notification of the ODD condition; and switch the AD system or the ADAS to the off mode after reception of the command.

* * * * *